US011658332B2

(12) United States Patent
Pevear et al.

(10) Patent No.: US 11,658,332 B2
(45) Date of Patent: May 23, 2023

(54) STRUCTURAL BATTERY PACKS AND METHODS RELATED THERETO

(71) Applicant: CABAN SYSTEMS, INC., Burlingame, CA (US)

(72) Inventors: Brian J. Pevear, San Mateo, CA (US); Alexandra Rasch, San Francisco, CA (US)

(73) Assignee: CABAN SYSTEMS, INC., Burlingame, CA (US)

( * ) Notice: Subject to any disclaimer, the term of this patent is extended or adjusted under 35 U.S.C. 154(b) by 520 days.

(21) Appl. No.: 16/813,618

(22) Filed: Mar. 9, 2020

(65) Prior Publication Data
US 2020/0287184 A1 Sep. 10, 2020

Related U.S. Application Data

(60) Provisional application No. 62/816,208, filed on Mar. 10, 2019.

(51) Int. Cl.
H01M 10/0525 (2010.01)
H01M 50/258 (2021.01)
(Continued)

(52) U.S. Cl.
CPC ..... *H01M 10/0525* (2013.01); *H01M 50/258* (2021.01); *H01M 50/576* (2021.01);
(Continued)

(58) Field of Classification Search
CPC ............. H01M 50/20; H01M 10/0525; H01M 50/258; H01M 50/502; H01M 50/576;
(Continued)

(56) References Cited

U.S. PATENT DOCUMENTS 4,360,574 A 11/1982 Park
11,217,862 B2 1/2022 Barton et al.
(Continued)

FOREIGN PATENT DOCUMENTS

CN 203721778 U 7/2014
CN 103904263 B 12/2015
(Continued)

OTHER PUBLICATIONS

International Search Report and Written Opinion, International Application No. PCT/US2020/021778, dated Jul. 3, 2020, 11 pages.

*Primary Examiner* — Gary D Harris
(74) *Attorney, Agent, or Firm* — Willink & Hunt LLP; Marcus T. Hunt

(57) ABSTRACT

Batteries are provided that include a base including a body having a hole, and an inner wall extending away from the base and disposed around the hole. An interior of the inner wall and the hole form at least part of a through-hole extending through the battery. The battery includes an outer wall extending away from the base and disposed around the inner wall. Cells are disposed on the base and between the inner wall and the outer wall. Structural battery packs are also provided that include: a hollow elongated member including a first interior space between its first and second ends; and one or more batteries disposed around the hollow elongated member between its first and second ends. Each battery includes a through-hole. The hollow elongated member is disposed through the through-hole of each battery. Methods related to the batteries and the structural battery packs are also provided.

22 Claims, 13 Drawing Sheets

(51) Int. Cl.
*H01M 50/576* (2021.01)
*H01M 50/502* (2021.01)
*H01M 50/278* (2021.01)
*H01M 50/276* (2021.01)
*H01M 50/213* (2021.01)

(52) U.S. Cl.
CPC ........ *H01M 50/213* (2021.01); *H01M 50/276* (2021.01); *H01M 50/278* (2021.01); *H01M 50/502* (2021.01)

(58) Field of Classification Search
CPC ............. H01M 50/213; H01M 50/276; H01M 50/278; H01M 10/052; H01M 2220/10; Y02E 60/10
USPC .......................................................... 429/99
See application file for complete search history.

(56) References Cited

U.S. PATENT DOCUMENTS

2010/0330399 A1* 12/2010 Grossman ........... H01M 50/213
429/7
2015/0340672 A1 11/2015 Walpurgis
2019/0312244 A1 10/2019 Irish et al.

FOREIGN PATENT DOCUMENTS

| CN | 106654334 A | 5/2017 |
| KR | 1020150115800 A | 10/2015 |
| KR | 101916165 B1 | 1/2019 |
| WO | 2021102340 A1 | 5/2021 |

* cited by examiner

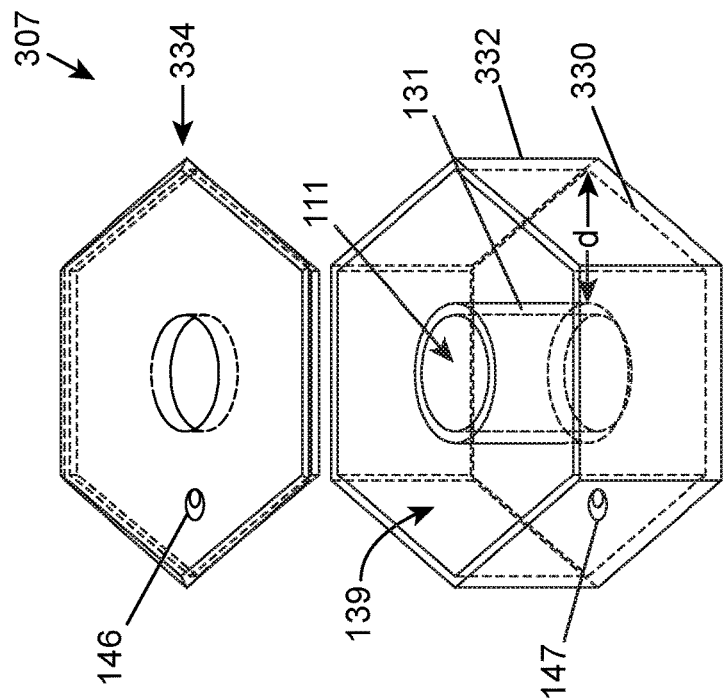
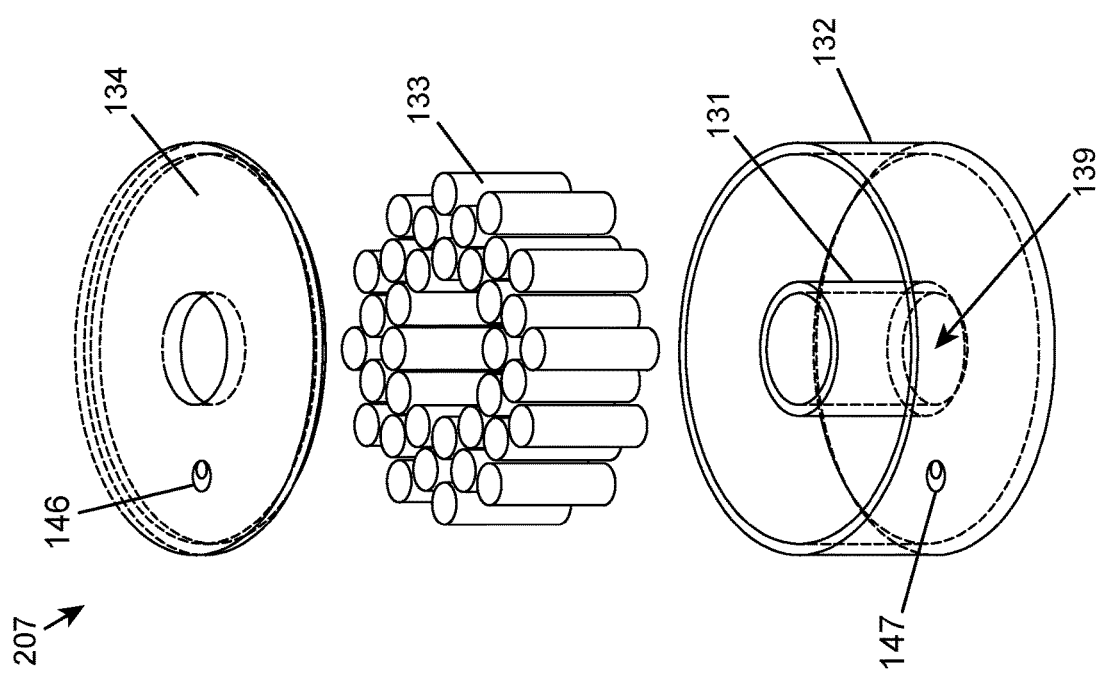
FIG. 1F
FIG. 1E

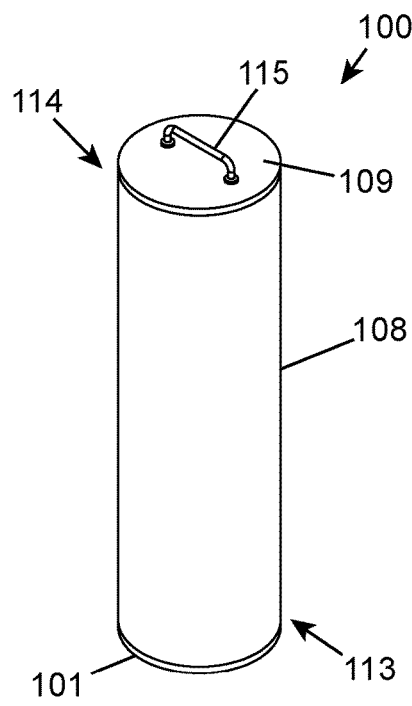
FIG. 2A
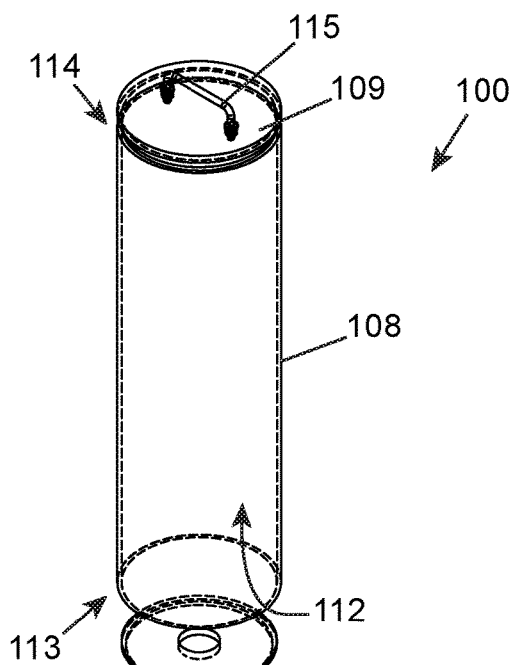
FIG. 2B
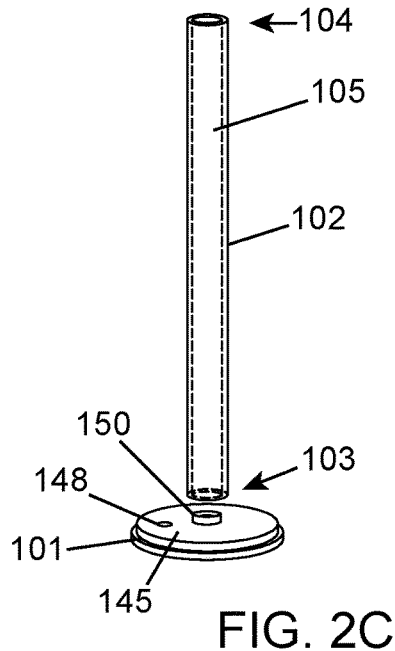
FIG. 2C
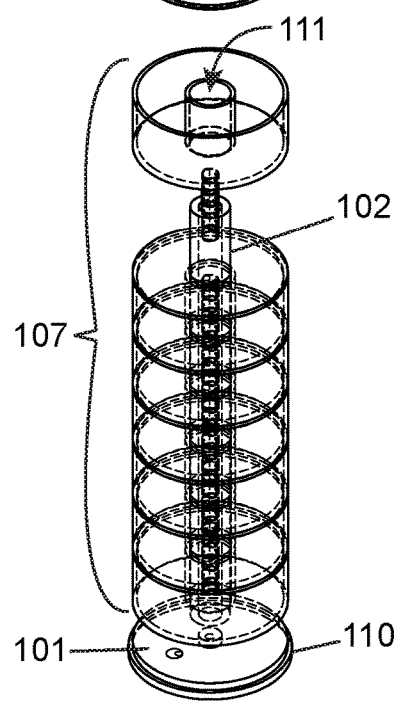

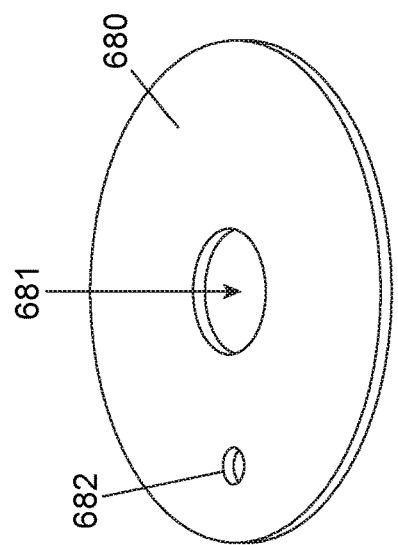
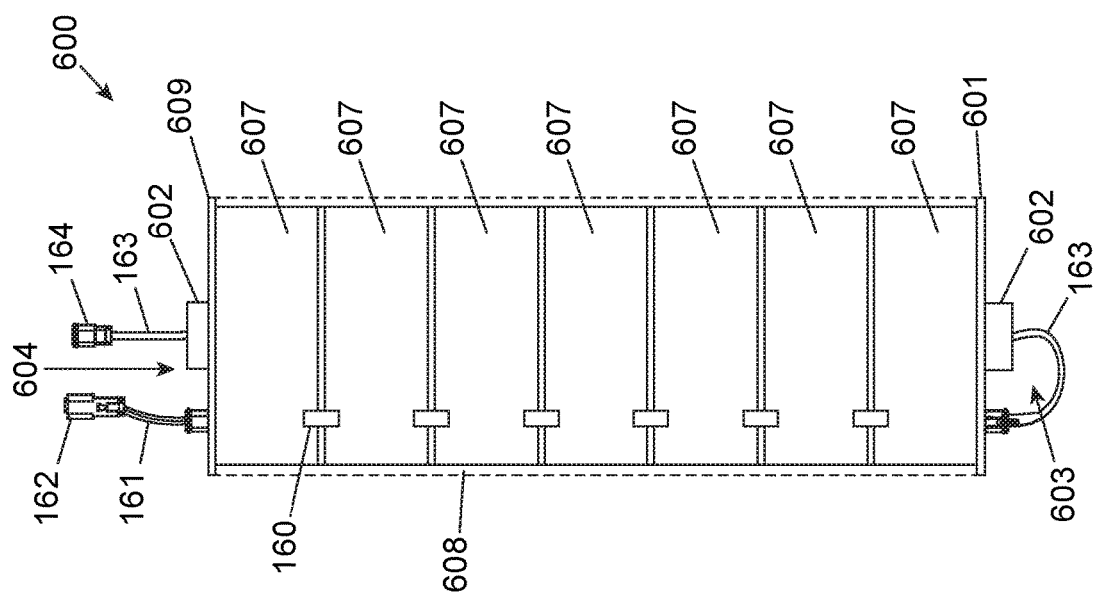
FIG. 5B
FIG. 5A

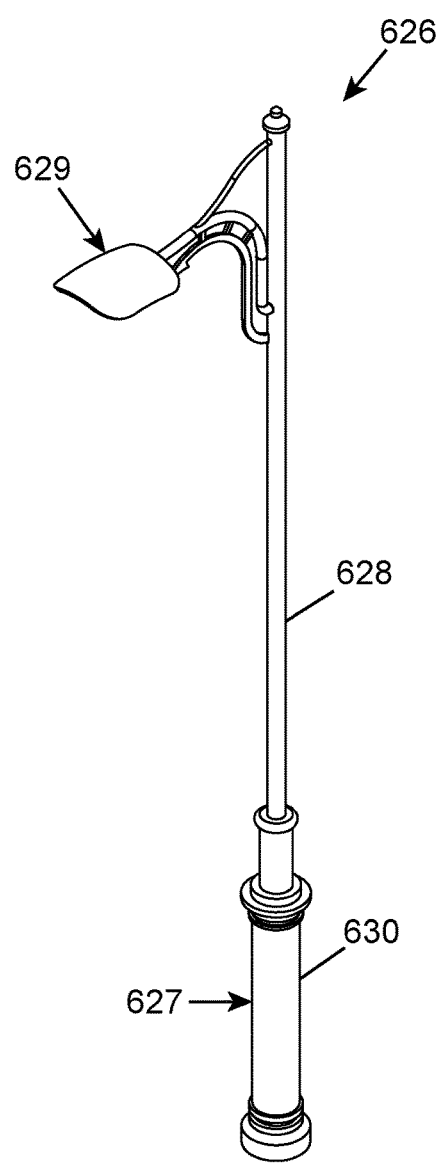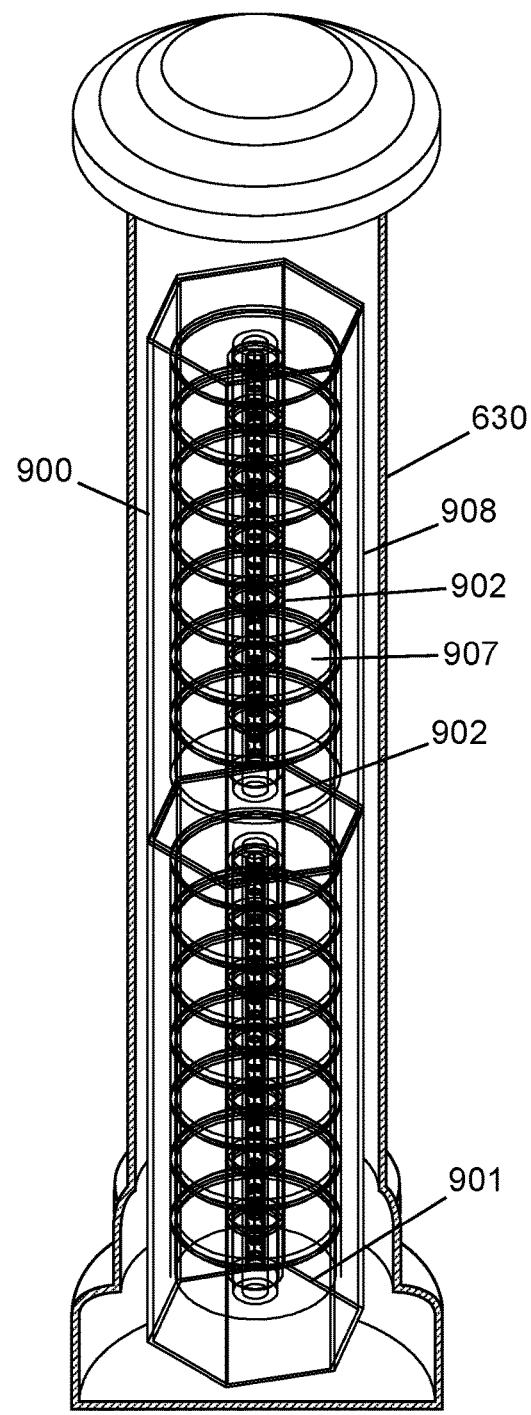
FIG. 9A
FIG. 9B

STRUCTURAL BATTERY PACKS AND METHODS RELATED THERETO

CROSS-REFERENCE TO RELATED APPLICATIONS

This application claims benefit under 35 U.S.C. § 119(e) of U.S. Provisional Application No. 62/816,208, filed Mar. 10, 2019, the entirety of which is incorporated herein by reference.

FIELD

The present disclosure relates generally to the field of energy storage, and more particularly to batteries and structural battery packs.

BACKGROUND

A battery can include one or more electrochemical cells that allow the battery to supply electric power to an external electric load when it is connected to the battery. Batteries can be classified into primary batteries that desired to be used and discarded, and secondary batteries that can be recharged by applying electric current to the cells. Rechargeable batteries can include wet cells (e.g., lead-acid batteries) and dry cells (e.g., nickel-cadmium, nickel-zinc, nickel metal hybrid, and lithium-ion). Batteries can be configured in various configurations, such as in series, parallel, or some combination of series and parallel, to form battery packs.

Battery packs can be used to provide power in various applications, ranging from small hand-held electronic devices to larger industry applications, including residential, commercial, and governmental applications. With larger industrial applications, the battery packs typically require greater voltage potentials, which can make the batteries large, heavy, and bulky. The battery packs typically include a large boxy enclosure that takes quite a bit of space to store or install, and is generally difficult to transport. In larger industrial applications, the battery packs are typically installed within an equipment shelter or box that is placed next to the structure needing power. The equipment shelters are typically box-shaped structures that are relatively large and bulky, requiring a correspondingly large amount of space in addition to the space needed for the structure requiring power. The site or location of the structure requiring battery power can often be limited in space and/or be in an environment that makes it difficult or impossible set up the structure and a large equipment shelter. For example, cellular sites (e.g., macro cell sites, micro cell sites, small-cell radio nodes, etc.) can be located on rooftops or in outdoor environments. Rooftop and outdoor environments can have extremely limited space and/or have a surrounding that makes it difficult or impossible to set up a cellular site and traditional equipment shelter, such as a small hilltop, area with dense vegetation, small rooftop, etc. Moreover, an existing structural site already may have a sufficient amount of existing equipment that limits the amount of space remaining to install any additional equipment and/or battery packs. In addition, battery theft has become an issue for sites requiring battery power, such as cellular sites for instance. Criminals often target these sites to steal batteries, including lithium-ion batteries and lead-acid batteries, to illegally sell. The large boxy housing of batteries stored next to structural sites can make it easy for criminals to identify and easy to access. Battery theft is a serious issue for companies that costs the company in time, resources, and money to deal with.

SUMMARY

In one aspect of the present disclosure, a structural battery pack is provided that includes: a hollow elongated member including a first interior space (or channel, cavity, etc.) between first and second ends of the hollow elongated member; and one or more batteries disposed around the hollow elongated member between the first and second ends of the hollow elongated member. Each of the one or more batteries includes a through-hole. The hollow elongated member is disposed through the through-hole of each of the one or more batteries.

In an embodiment, each of the one or more batteries includes: a base including a body having a hole disposed in the body; an inner wall extending away from the base and disposed around the hole; and an outer wall extending away from the base and disposed around the inner wall. An interior of the inner wall and the hole form at least part of the through-hole extending through the respective battery. The through-hole is shaped and sized to fit the hollow elongated member within the through-hole. A plurality of cells is disposed on the base and between the inner wall and the outer wall.

In an embodiment, the structural battery pack further includes a first base. The hollow elongated member extends away from the first base to the first end of the hollow elongated member. The first end of the hollow elongated member is distal to the first base. The one or more batteries are disposed around the hollow elongated member between the first base and the first end of the hollow elongated member.

In an embodiment, the structural battery pack further includes an end cap. The hollow elongated member extends away from the end cap to the second end of the hollow elongated member. The second end of the hollow elongated member is distal to the end cap. The one or more batteries are disposed: between the end cap and the second end of the hollow elongated member; and between the end cap and the first base.

In an embodiment, the structural battery pack further includes a hollow elongated shell including a second interior space between first and second ends of the hollow elongated shell. The hollow elongated shell extends away from the first base to the first end of the hollow elongated shell. The hollow elongated shell extends away from the end cap to the second end of the hollow elongated shell. The batteries are disposed in the second interior space of the hollow elongated shell.

In an embodiment, the structural battery pack further includes one or more protective inserts disposed around the hollow elongated member. The one or more protective inserts are disposed within the second interior space of the hollow elongated shell.

In an embodiment, the structural battery pack further includes a first wire coupled to a first terminal of the one or more batteries. The first terminal serves as a first end of voltage potential for the one or more batteries. The first wire extends through the hollow elongated member. The structural battery pack further includes a second wire coupled to a second terminal of the one or more batteries. The second terminal serves as a second end of voltage potential for the one or more batteries. The one or more batteries include a plurality of rechargeable lithium-ion batteries. The structural battery pack further includes interconnecting bars coupled between each of the plurality of batteries such that the plurality of batteries is configured to generate the voltage potential.

In an embodiment, each of the one or more batteries includes: a second base including a body having a hole disposed in the body; and an inner wall extending away from the second base and disposed around the hole. An interior of the inner wall and the hole form at least part of the through-hole extending through the respective battery. The through-hole is shaped and sized to fit the hollow elongated member within the through-hole. Each of the one or more batteries further includes an outer wall extending away from the second base and disposed around the inner wall. A plurality of rechargeable cells is disposed on the second base and between the inner wall and the outer wall.

In an embodiment, the hollow elongated shell has a hexagonal-tube shape. The end cap and the first base have a hexagonal shape and are sized to align with the first and second ends of the hollow elongated shell, respectively. In an embodiment, the outer wall has a hexagonal-tube shape. In another embodiment, the outer wall has a cylindrical-tube shape.

In an embodiment, the hollow elongated shell has a cylindrical-tube shape. The end cap and the first base have a cylindrical shape and are sized to align with the first and second ends of the hollow elongated shell, respectively. In an embodiment, the outer wall has a cylindrical-tube shape.

In an embodiment, the structural battery pack further includes a hollow elongated shell including a second interior space between first and second ends of the hollow elongated shell. The hollow elongated shell extends away from the first base to the first end of the hollow elongated shell. The batteries are disposed in the second interior space of the hollow elongated shell.

In an embodiment, the structural battery pack further includes one or more protective inserts disposed around the hollow elongated member. The one or more protective inserts are disposed around the hollow elongated member between the first base and the first end of the hollow elongated member.

In one aspect of the present disclosure, a battery is provided that includes: a base including a body having a hole disposed in the body; and an inner wall extending away from the base and disposed around the hole. An interior of the inner wall and the hole form at least part of a through-hole extending through the battery. The battery further includes an outer wall extending away from the base and disposed around the inner wall. A plurality of cells is disposed on the base and between the inner wall and the outer wall.

In an embodiment, the hole is disposed in a center of the base. The outer wall has a cylindrical-tube shape and is concentrically disposed around the center of the base.

In an embodiment, the hole has a circular shape, and wherein the inner wall has a cylindrical-tube shape and is concentrically disposed around the center of the base.

In an embodiment, the battery further includes a cover. The inner and outer walls extend away from the cover. The cover is disposed at a first end of the inner and outer walls. The base is disposed at a second end of the inner and outer walls. An interior space is formed between the base, the cover, and the inner and outer walls. The cells are rechargeable cells and disposed in the interior space.

In an embodiment, the battery further includes one or more cell modules disposed in the interior space. The one or more cell modules include the cells, and the cells are lithium-ion cells.

In an embodiment, the hole is disposed in a center of the base. The outer wall has a hexagonal-tube shape and is concentrically disposed around the center of the base.

In an embodiment, the battery further includes a cover. The inner and outer walls extend away from the cover. The cover has a hexagonal shape and is disposed at a first end of the inner and outer walls. The base is disposed at a second end of the inner and outer walls. An interior space is formed between the base, the cover, and the inner and outer walls. The cells are rechargeable cells and disposed in the interior space.

In one aspect of the present disclosure, a method of making a structural battery pack is provided that includes: providing a hollow elongated member including a first interior space between first and second ends of the hollow elongated member; disposing a plurality of batteries around the hollow elongated member by inserting the hollow elongated member through through-holes in each of the batteries; connecting the batteries of the plurality with interconnecting bars; and coupling a first base to a first end of the hollow elongated member. Each of the batteries includes: a second base including a body having a hole disposed in the body; and an inner wall extending away from the second base and disposed around the hole. An interior of the inner wall forms a through-hole extending through the respective battery. Each of the batteries further includes an outer wall extending away from the second base and disposed around the inner wall. A plurality of cells is disposed on the second base and between the inner wall and the outer wall.

In an embodiment, the method further includes disposing one or more protective inserts around the hollow elongated member.

In an embodiment, the method further includes coupling a first wire to a first terminal of the one or more batteries. The first terminal serves as a first end of voltage potential for the one or more batteries. The method further includes: extending the first wire through the hollow elongated member; coupling a second wire to a second terminal of the one or more batteries. The second terminal serves as a second end of voltage potential for the one or more batteries. The method further includes coupling an end cap to the second end of the hollow elongated member. The plurality of cells is rechargeable lithium-ion cells.

In one aspect of the present disclosure, a method of making a battery is provided that includes providing a container to hold one or more cells. The container includes: a base including a body having a hole disposed in the body; and an inner wall extending away from the base and disposed around the hole. An interior of the inner wall and the hole form at least part of a through-hole extending through the battery. The container further includes an outer wall extending away from the base and disposed around the inner wall. The method further includes securing a plurality of cells within the container.

In an embodiment, the method further includes coupling a cover to the container such that the inner and outer walls extend away from the cover. The cover is disposed at a first end of the inner and outer walls. The base is disposed at a second end of the inner and outer walls. An interior space is formed between the base, the cover, and the inner and outer walls. The cells are rechargeable cells and disposed in the interior space.

In an embodiment, the hole is disposed in a center of the base. The outer wall has a cylindrical-tube shape and is concentrically disposed around the center of the base.

In an embodiment, the hole is disposed in a center of the base. The outer wall has a hexagonal-tube shape and is concentrically disposed around the center of the base.

BRIEF DESCRIPTION OF THE DRAWINGS

For a better understanding of at least an embodiment, reference will be made to the following Detailed Description, which is to be read in conjunction with the accompanying drawings, wherein:

FIG. 1E illustrates an exploded perspective view of an exemplary battery with individual cells, according to an embodiment.

FIG. 1F illustrates an exploded perspective view of an exemplary battery without cell modules shown, according to an embodiment.

FIG. 2A illustrates a perspective view of an exemplary structural battery pack, according to an embodiment.

FIG. 2B illustrates a partially exploded perspective view of the structural battery pack of FIG. 2A, according to an embodiment.

FIG. 2C illustrates an exploded perspective view of the hollow elongated member and the base of FIG. 2B, according to an embodiment.

FIG. 5A illustrates a structural battery pack having a hollow elongated member extending out of its housing, according to an embodiment.

FIG. 5B illustrates a perspective view of the end cap and the base of FIG. 5A, according to an embodiment.

FIG. 9A illustrates a perspective view of a lamppost including a structural battery pack included within a base of the lamppost, according to an embodiment.

FIG. 9B illustrates a close-up perspective view of the base of FIG. 9A, according to an embodiment.

DETAILED DESCRIPTION

Figure 1A:
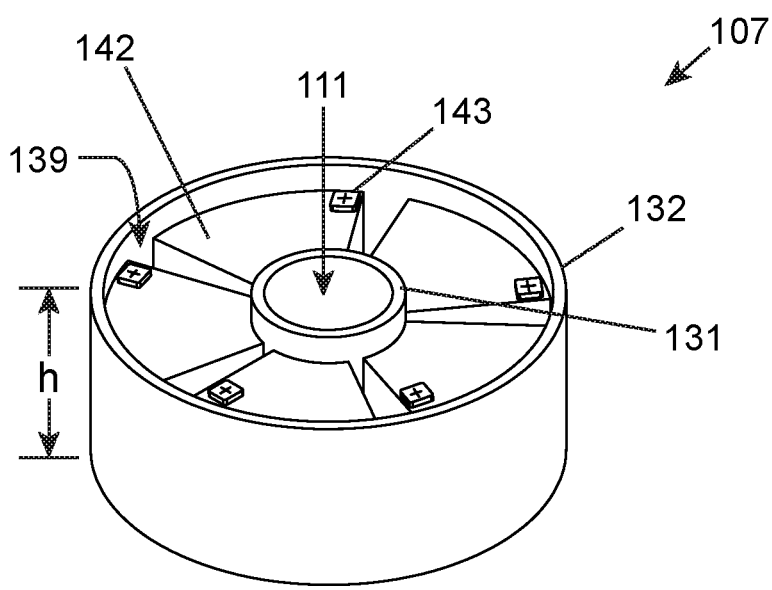
FIG. 1A illustrates a perspective view of an exemplary battery, according to an embodiment.

Before aspects of the present disclosure are described below with reference to the drawings in the description, common features may be designated by common reference numbers. Although certain examples are described herein with reference to a system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

In the present disclosure, references are made to the shape of various objects, such as having a "circular shape," "hexagonal shape," "cylindrical-tube shape," "hexagonal-tube shape," etc. It should be appreciated that such references are intended to include the indicated shape as well as essentially the indicated shape. For example, references to having a "circular shape" are intended to also include an essentially circular shape.

As summarized above, in one aspect, a battery is provided that includes: a base including a body having a hole disposed in the body; and an inner wall extending away from the base and disposed around the hole. An interior of the inner wall and the hole form at least part of a through-hole extending through the battery. The battery further includes an outer wall extending away from the base and disposed around the inner wall. A plurality of cells is disposed on the base and between the inner wall and the outer wall. The battery can have various benefits and advantages, such as providing a "tube pan" container that can hold the cells (or battery cells) or cell modules including the cells; providing a heat exchange element via the through-hole, which allows air flow between the cells; allowing for a configuration that can be easily stacked and coupled, etc. A method of making (or assembling) the battery is also provided that can provide various benefits and advantages, such as reducing manufacturing complexity, reducing manufacturing costs, etc.

The battery (and other similar batteries) can also be disposed around a hollow elongated member in order to create a structural battery pack. As summarized above, in one aspect, a structural battery pack is provided that includes: a hollow elongated member including a first interior space between first and second ends of the hollow elongated member; and one or more of the batteries disposed around the hollow elongated member between the first and second ends of the hollow elongated member. Each of the one or more batteries includes a through-hole. The hollow elongated member is disposed through the through-hole of each of the one or more batteries. The structural battery pack can have many benefits and advantages, such as providing a thin and compact design that allows for efficient space-saving during storage and at installation; providing structural value to installation sites; providing a protection to the batteries; reduce manufacturing complexity and costs; allow for energy-storage installation at sites where it is difficult or impossible with traditional batteries; aid in theft prevention, etc. Various embodiments of the battery, structural battery pack, and methods related to both, are provided herein and described with respect to the figures included herein. It should be appreciated that the figures include diagrams of illustrative embodiments and that the components (e.g., modules, blocks, structures, devices, features, etc.) shown may be variously combined, separated, removed, reordered, and replaced in a manner other than as expressly described and depicted herein. It should be appreciated that the diagrams may include additional components that are not necessarily shown or described, but which have been left out for the sake of clarity and brevity. Similarly, the operations described for the methods of making and using the batteries and structural battery packs are illustrative and may be variously combined, separated, removed, reordered, and replaced in a manner other than as expressly described and depicted herein. It should be appreciated that the diagrams may include additional operations that are not necessarily shown or described, but which have been left out for the sake of clarity and brevity.

Batteries

Figure 1B:
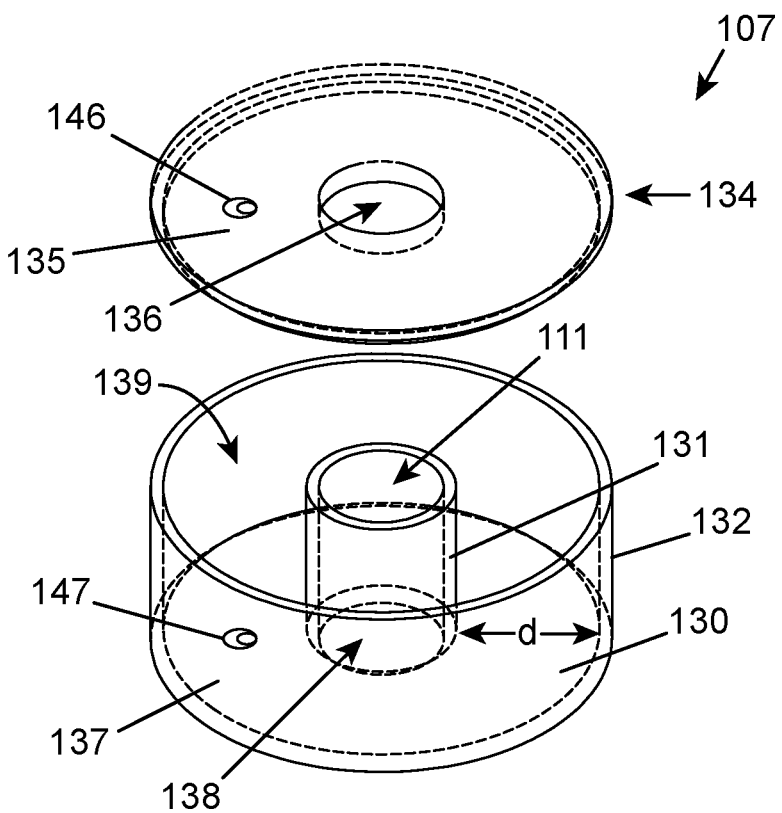
FIG. 1B illustrates an exploded perspective view of the battery shown in FIG. 1A without cell modules and a cover, according to an embodiment.

FIG. 1A illustrates a perspective view of a battery 107, according to an embodiment. The battery 107 is shown including a base 130, an inner wall 131, an outer wall 132, and a cover 134. FIG. 1B illustrates an exploded perspective view of the battery 107 shown in FIG. 1A without the cover 134, according to an embodiment. In FIG. 1B, the cell modules 142 and the cover 134 are not shown to facilitate understanding. FIG. 1B is described here in conjunction with FIG. 1. The base 130 includes a body 137 having a hole 138. The hole 138 is shown concentrically disposed in the center of the base 130. A proximal end of the inner wall 131 is disposed on the base 130 around a perimeter of the hole 138. The inner wall 131 extends distally away from the base 130. A distal end of the inner wall 131 is distal to the base 130. A proximal end of the outer wall 132 is disposed on the base 130 and the outer wall extends distally away from the base 130. A distal end of the outer wall 132 is distal to the base 130. The outer wall 132 is disposed around the inner wall 131 and spaced apart from (e.g., a radial distance "d") the inner wall 131. The inner wall 131 and the outer wall 132 are shown having a cylindrical-tube shape (or, put another way, tubular with circular cross section) and are concentrically disposed with the center of the hole 138 in the base 130. The shape of the base 130 and the inner and outer walls 131 form a "tube pan" container that holds the cell modules 142.

Similar to the base 130, the cover 134 includes a body 135 having a hole 136. The hole 136 is shown concentrically disposed in the center of the cover 134. The cover 134 is configured to couple to the distal ends of the inner and outer walls 131,132. For example, the cover 134 and the outer wall 132 include threading around their perimeter that enables the cover 134 to screw into the outer wall 132. When the cover 134 is coupled to the outer wall 132, the distal end of the inner wall 131 is disposed around the hole 136 in the cover 134. The inner and outer walls 131,132 extend away from the cover 134. In other embodiments, any other suitable coupling mechanisms can be implemented to couple the cover 134 to the tube pan container. For example, in an embodiment, the cover 134 can include a lip around its perimeter and be shaped and sized to pressure fit within the outer wall 132 with the lip abutting the distal end of the outer wall 132.

Figure 1C:
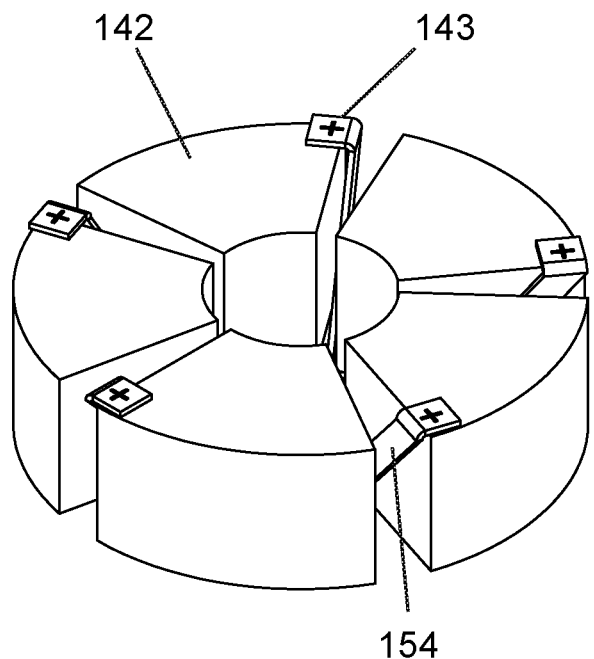
FIGS. 1C and 1D illustrate a perspective and bottom view, respectively, of the cell modules shown in FIG. 1B, according to an embodiment.
Figure 1D:
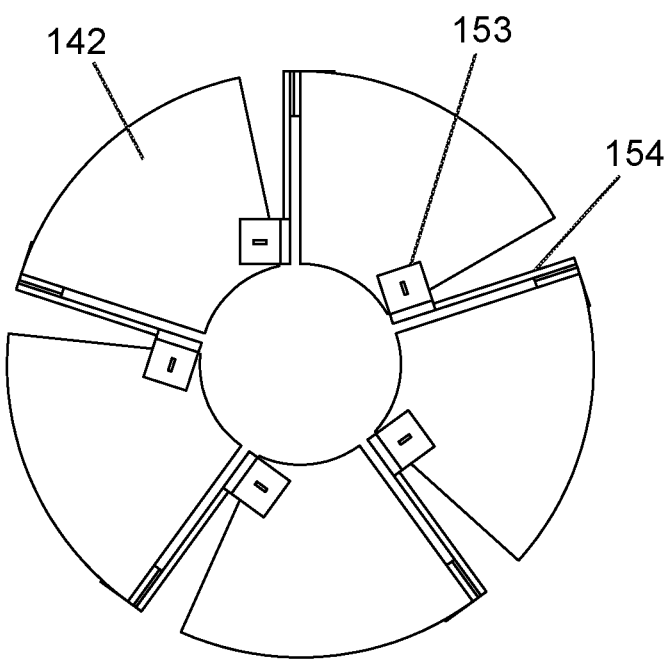

The inner wall 131, the outer wall 132, the body 137 of the base 130, and the body 135 of the cover 134 form an interior space (or volume) 139. The cell modules 142 are disposed within the interior space 139. The cell modules 142 can be electrically coupled as necessary (e.g., in series) to form the desired voltage potential of the battery 107, which can vary based on application. FIGS. 1C and 1D illustrate a perspective and bottom view, respectively, of the cell modules 142 shown in FIG. 1A, according to an embodiment. FIGS. 1C and 1D are described here in conjunction with FIGS. 1A and 1B. The cell modules 142 are shown including positive terminals 143 and negative terminals 153. The cell modules 142 are coupled in series with interconnecting bars (e.g., busbars) 144 by connecting the appropriate positive terminals 143 with the appropriate negative terminals 153.

Inside the cell modules 142 are cells, which are not shown in FIG. 1A-1D. In an embodiment, the cells are rechargeable cells, such as lithium-ion cells or any other suitable rechargeable cell. The cells can be configured in any suitable series and/or parallel configuration to provide the desired voltage potential. For instance, the cell modules 142 can include multiple "bricks" coupled in series, where each "brick" has multiple cells coupled in parallel. As an illustrative example, fifty 3-volt cells can be coupled in parallel to form a brick, and 16 bricks can be coupled in series to form 48 volts. The battery 107 can be configured to have any suitable voltage as desired for various applications.

A hole 146 in the cover 134 can be used to access the appropriate positive terminal 143 that serves as the positive terminal of the battery 107. Similarly, a hole 147 in the base 130 can be used to access the appropriate negative terminal 153 that serves as the negative terminal of the battery 107. For example, when connecting two batteries 107 in series, interconnecting bars (not shown in FIGS. 1A through 1D) can be used to couple the appropriate positive and negative terminals of the batteries 107 via the appropriate holes 146,147.

A through-hole 111 extends through the center of the battery 107. In the embodiment shown in FIGS. 1A and 1B, the base 130 and the cover 134 are shaped as flat discs having the respective holes 138,136 disposed in the center of the discs. The inner wall 131 is disposed around the holes 138,136. The through-hole 111 of the battery 107 is formed by the holes 138,136 and the interior of the inner wall 131. The outer wall 132 is coupled to the outer perimeters of the base 130 and the cover 134. The outer wall 132 is spaced a radial distance "d" away from the inner wall 131. The inner and outer walls 131,132 are shown approximately equal in height (i.e., lengths from their proximal end to their distal end), as represented by "h" in in FIG. 1A. In other embodiments, the heights of the inner and outer walls 131,132 can differ from one another. Any suitable distance "d" can be implemented in various embodiments. Example lengths for the distance "d" includes, but is not limited to, lengths ranging from 2 ft. or less, such as 0.25 ft. to 1 ft. Example heights "h" for the inner wall 131 and the outer wall 132 can include, but are not limited to, heights ranging from 2 ft. or less, such as 0.25 ft. to 1 ft. The cell modules 142 are disposed within the interior space 139. The radial distance "d" and the height "h" of the inner wall 131 can be set to the appropriate length so that the cells 133 are stably disposed within the interior space 139 with minimal to no movement.

The shape of the tube pan container can vary in other embodiments. For example, the inner wall 131 and the through-hole 111 can be a regular geometric shape (e.g., a square-tube, oval-tube, hexagonal-tube, other polygonal-tube, etc.) or irregular shape in other embodiments. The outer wall 132 can have a regular geometric shape (e.g., a square-tube, oval-tube, hexagonal-tube, other polygonal-tube, etc.) or irregular shape in other embodiments, independent of the shape of the inner wall 131 and the through-hole 111. The terms "square-tube shape," "oval-tube shape," and "polygonal-tube shape" are used herein to mean "tubular with a square cross section," "tubular with an oval cross section," and "tubular with a polygonal cross section." The base 130 and the cover 134 can be shaped to align with (e.g., match) the shapes of the inner and outer walls 131,132. As an illustrative example, the holes 136,138 of the respective cover 134 and base 130 can have a square shape to match the inner wall 131 having a square-tube shape, while the outer perimeters of the cover 134 and the base 130 have a hexagonal shape to match the outer wall 132 having a hexagonal-tube shape. Other combinations can be implemented accordingly in other embodiments to match other combinations of shapes for the inner wall 131 and the outer wall 132.

In other embodiments, individual cells can be disposed in the interior space 139 instead of the cell modules 142. FIG. 1E illustrates an exploded perspective view of a battery with individual cells, according to an embodiment. In FIG. 1E, a battery 207 is shown including the inner wall 131, the outer wall 132, the interior space 139, and the cover 134. The battery 207 of FIG. 1E is essentially the same as the battery 107 shown in FIGS. 1A and 1B, except that the battery 207 includes individual cells 133 disposed in the interior space 139 instead of the cell modules 142. Common features and functions are not repeated here for the sake of brevity. The cells 133 can be electrically coupled as necessary (e.g., in parallel and/or in series) to form the desired voltage potential of the battery 207, which can vary based on application. For example, interconnecting bars (not shown) can be connected to the cells 133 as necessary to form the desired parallel and series connections. As another example, the cover 134 can include electrical contacts and traces that electrically couple to the cells 133 as necessary to form the desired series and parallel connections.

FIG. 1F illustrates an exploded perspective view of an exemplary battery without cell modules shown, according to an embodiment. In FIG. 1F, a battery 307 shown including a tube pan container with the inner wall 131 having a cylindrical-tube shape, an outer wall 332 having a hexagonal-tube shape, a base 330 having a hexagonal shape, and a cover 334 having a hexagonal shape. In other embodiments, the inner wall can have a shape other than the cylindrical-tube shape shown, such as a square-tube shape, oval-tube shape, other polygonal-tube shape, etc. The shapes of the outer wall can also vary in other embodiments. Furthermore, the base and the cover can vary in other embodiments depending on the shapes of the inner and outer walls.

The base, the inner and outer walls, and the cover can be made from any suitable material that is sufficiently strong and durable so as to support and protect the cell modules or cells. Example materials can include, but are not limited to, one or more metals, metal alloys, polymeric material, or combination thereof. In an embodiment, for example, the base, the inner and outer walls, and the cover can be made of steel, stainless steel, aluminum, or a combination thereof, and coated with an insulating material, such as rubber or another polymeric material. In another embodiment, the base, the inner and outer walls, and the cover can be made of one or more insulating polymeric materials. The polymeric materials can also be selected to provide protection, such as from the elements (rain, sun, fire, etc.), scratches, denting, etc.

During assembly of the battery (e.g., the battery 107, 207, or 307), the base (e.g., the base 130 or 330) and the inner and outer walls (e.g., the inner 131 and outer walls 132 or 332) are provided and form the "tube pan" container. The tube pan container can be formed as an integrated unitary piece, such as by an extrusion process, molding process, or any other suitable manufacturing process. In other embodiments, the base and the inner and outer walls can be separate elements that are securely and stably coupled together. For example, the base and the inner and outer walls can include threading around their perimeters to appropriately screw together. In yet other embodiments, the base can be welded to the inner and outer walls. An insulating coating can also be applied to the tube pan container. Once the tube pan container is provided, the cell modules (e.g., the cell modules 142) or the cells (e.g., the cells 133) can be assembled, inserted within the interior space (e.g., the interior space 139), and disposed on the base between the inner and outer walls. The cell modules can be electrically coupled in the necessary configuration with interconnecting bars (e.g., the interconnecting bars 160) to form the desired voltage potential of the battery. The cover (e.g., the cover 134) can then be coupled to the tube pan container to cover the tube pan container with the cell modules disposed therein. For instance, the cover can be configured to screw onto the outer wall, pressure fit onto the outer wall, or couple to the tube pan container in any other suitable manner. The cover can serve to secure the cell modules or the cells within the tube pan container. In another embodiment, the cell modules or the cells can be secured to the base by any suitable mechanism, such as screws, bolts, adhesive, etc. The cover and the base can include holes (e.g., the holes 146,147), which can be aligned accordingly to enable access to the appropriate positive and negative terminals (e.g., the positive and negative terminals 143,153) for the desired voltage potential of the battery. In use, a load can be applied to the appropriate positive and negative terminals to power the load with the desired voltage potential of the battery. For example, a positive load connection can be coupled to the appropriate positive and negative terminals via the holes in the cover and the base, respectively. In some instance, the battery can be electrically coupled to a power-generating source, such as solar panels, to enable the batteries to be charged.

Structural Battery Packs

The batteries described herein can also be implemented in various structural battery packs, as disclosed herein. Multiple batteries can also be coupled in series, parallel, or in combination thereof, with interconnecting bars and a load applied across the voltage potential of the series. While embodiments of the structural battery packs are described herein with reference to the batteries being connected in series, it should be appreciated that the batteries can be connected in different configurations in other embodiments, such as in parallel or in a parallel and series combination, without compromising the underlying principles of the structural battery packs.

FIG. 2A illustrates a perspective view of a structural battery pack, according to an embodiment. FIG. 2B illustrates a partially exploded perspective view of the structural battery pack of FIG. 2A, according to an embodiment. FIG. 2B is described here in conjunction with FIG. 2A. A structural battery pack 100 is shown including a base 101, a hollow elongated member 102, a set of the batteries 107 from FIGS. 1A-1D (of which one is shown in exploded view without the cell modules 142), a hollow elongated shell 108, and an end cap 109. In other embodiments, the battery 207 of FIG. 1E can be implemented in the structural battery pack 100. The features and functions of the battery 107,207 described in FIGS. 1A-1E are applicable here for the batteries 107 shown in FIG. 2, but are not repeated here for the sake of brevity.

Together, the base 101, the hollow elongated shell 108, and the end cap 109 form an exterior housing that houses the hollow elongated member 102 and the batteries 107. The hollow elongated shell 108 provides protection to the batteries and can serve as an insulated conduit, heat exchange element, and sealant for the batteries. The hollow elongated shell 108 can also serve as a structural element for a larger system, such as solar panel system, lighting system (e.g., lamppost, etc.), cellular sites, etc. The batteries 107 are disposed around the hollow elongated member 102 and stacked between the two ends of the hollow elongated member. FIG. 2C illustrates an exploded perspective view of the hollow elongated member 102 and the base 101 of FIG. 2B, according to an embodiment. FIG. 2C is described here in conjunction with FIGS. 2A and 2B. The hollow elongated member 102 includes a proximal end 103, a distal end 104, and an interior space 105 (represented within dotted lines in FIG. 2C) between the proximal and distal ends 103,104. The hollow elongated member 103 extends longitudinally away from the base 101—from the proximal end 103 (proximal to the base 101) to the distal end 104 (distal to the base 101). The hollow elongated member 102 can also serve as an insulated electrical conduit for any wiring passing through the interior space 105, as well as a heat exchange element by providing air (or airflow) through its interior space.

The hollow elongated member 102 is shown having a cylindrical-tube shape (e.g., the shape of a round pipe) with openings at the proximal and distal ends 103,104. The hollow elongated member 102 is shaped and sized so as to form fit within the through-hole 111 in each of the batteries 107. The through-hole 111 is shown having a cylindrical-tube shape. In this way, the shape and size of the hollow elongated member 102 are approximately the same shape and size of the through-hole 111 in the batteries 107, resulting in the batteries 107 fitting stably around the hollow elongated member 102. Example widths (e.g., diameters) of the hollow elongated member 102 can include, but are not limited, to widths of 8 in. or less, such as between 1 in. to 4 in. Example thicknesses of the hollow elongated member 102 can include, but are not limited, to thicknesses of 2 in. or less, such as between 0.125 in. and 1 in. The lengths of the hollow elongated member 102 can vary based on the number of batteries 107 implemented in the set. Example lengths can include, but are not limited, to lengths of 10 ft. or less, such as between 1 ft. and 6 ft. It should be appreciated that widths, thicknesses, and lengths outside of these illustrative example widths, thicknesses, and lengths can be implemented in other embodiments without undermining the underlying principles of the present disclosure. The shape and size of the hollow elongated member 102 can vary in other embodiments than that shown in FIGS. 2A-2C, but should be shaped and sized to fit through the through-hole 111 in the batteries 107. For example, the hollow elongated member 102 can include any suitable tubular shape, such as a regular geometric tubular shape (e.g., square-tube shape, oval-tube shape, other polygonal-tube shape, etc.) or an irregular tubular shape. In such case, the through-hole 111 can include an appropriate shape and size to fit (e.g., match) the hollow elongated member. For instance, the through-hole 111 can have a square-tube shape that is sized to fit a hollow elongated member that is also square-tube shaped, or can have an oval-tube shape that is sized to fit a hollow elongated member that is also oval-tube shaped, etc.

In FIGS. 2A-2C, the hollow elongated member 102 is concentrically disposed in the center of the base 101, and extends away from the center of the base 101. The base 101 includes a body 145 having a coupling (or mating) element 150. For example, the coupling element 150 can include a threaded protrusion that enables the hollow elongated member 102 to screw onto the coupling element 150. The base 101 is shown including a hole 148 in the top surface of the base 101. The base 101 is at least partially hollow so that a wire can run through the base 101 via the hole 148 and the coupling element 150, through the hollow elongated member 102, and out the distal end 104 of the hollow elongated member 102. In other embodiments, another suitable coupling element can be implemented to stably or securely couple the hollow elongated member 102 to the base 101. In yet other embodiments, the hollow elongated member 102 can be welded to the base 101, or the hollow elongated member 102 and base 101 can be formed from a molding process and integrated as a unitary piece.

In FIGS. 2A-2C, the base 101 is circular (e.g., having a circular perimeter) and is generally shaped as a flat or rounded disc. The bottom surface of the base 101 is flat so that the structural battery pack 100 can stably stand on the base 101. The top surface of the base 101 can also be generally flat to stably support the batteries 107 when stacked next to (e.g., against or above) the base 101. The base 101 is sized so as to have a slightly larger area than the batteries 107 when stacked next to the base 101. In this way, the hollow elongated shell 108 can be placed over the batteries 107 and hollow elongated member 102 and couple to the base 101—e.g., screw onto the outer perimeter of the base 101. Example widths (e.g., diameters) of the base 102 can include, but are not limited, to widths of 3 ft. or less, such as 0.5 ft. to 1.5 ft. Example thicknesses of the base 102 can include, but are not limited, to thicknesses of 6 in. or less, such as between 0.125 in. and 2 in. It should be appreciated that widths and thicknesses outside of these illustrative example widths and thicknesses can be implemented in other embodiments without undermining the underlying principles of the present disclosure. In other embodiments, the base 101 can have another suitable shape and size that allows the base 101 and the hollow elongated shell 108 to form part of the exterior housing. In an embodiment, for example, the base 101 has a hexagonal shape (or, put another way, tubular with a hexagonal cross section) that aligns with a hollow elongated shell 108 having a hexagonal-tube shape. In other embodiments, the base 101 can have another regular geometric shape (e.g., square, oval, other polygon, etc.) or irregular shape. For example, the hollow elongated member 102 can have a cylindrical-tube shape and be disposed concentrically at the center of the base 101 having a hexagonal shape.

The batteries 107 are shown including a through-hole 111 having a cylindrical-tube shape. The batteries 107 can be disposed around the hollow elongated member 102 by inserting the hollow elongated member 102 through the through-hole 111. The batteries 107 can then be slid along the hollow elongated member 102 and stacked next to the base 101. The through-hole 111 can be shaped and sized to form fit around the hollow elongated member 102. In this way, the shape and size of the through-hole 111 is approximately (e.g., slightly larger than) the hollow elongated member 102, resulting in the batteries 107 being able to slide along the hollow elongated member 102 but, at the same time, fit stably around the hollow elongated member 102 with minimal to no wobble. As noted previously, the shape and size of the through-hole 111 can vary in other embodiments, but should be shaped and sized to receive the hollow elongated member 102. In an embodiment, the through-hole 111 is shaped to match the shape of the hollow elongated member 102. In another embodiment, the shape of the through-hole 111 is different than the shape of the hollow elongated member 102. For instance, the through-hole 111 can have a circular-tube shape while the hollow elongated member 102 has a square-tube shape, or vice versa.

Figure 2D:
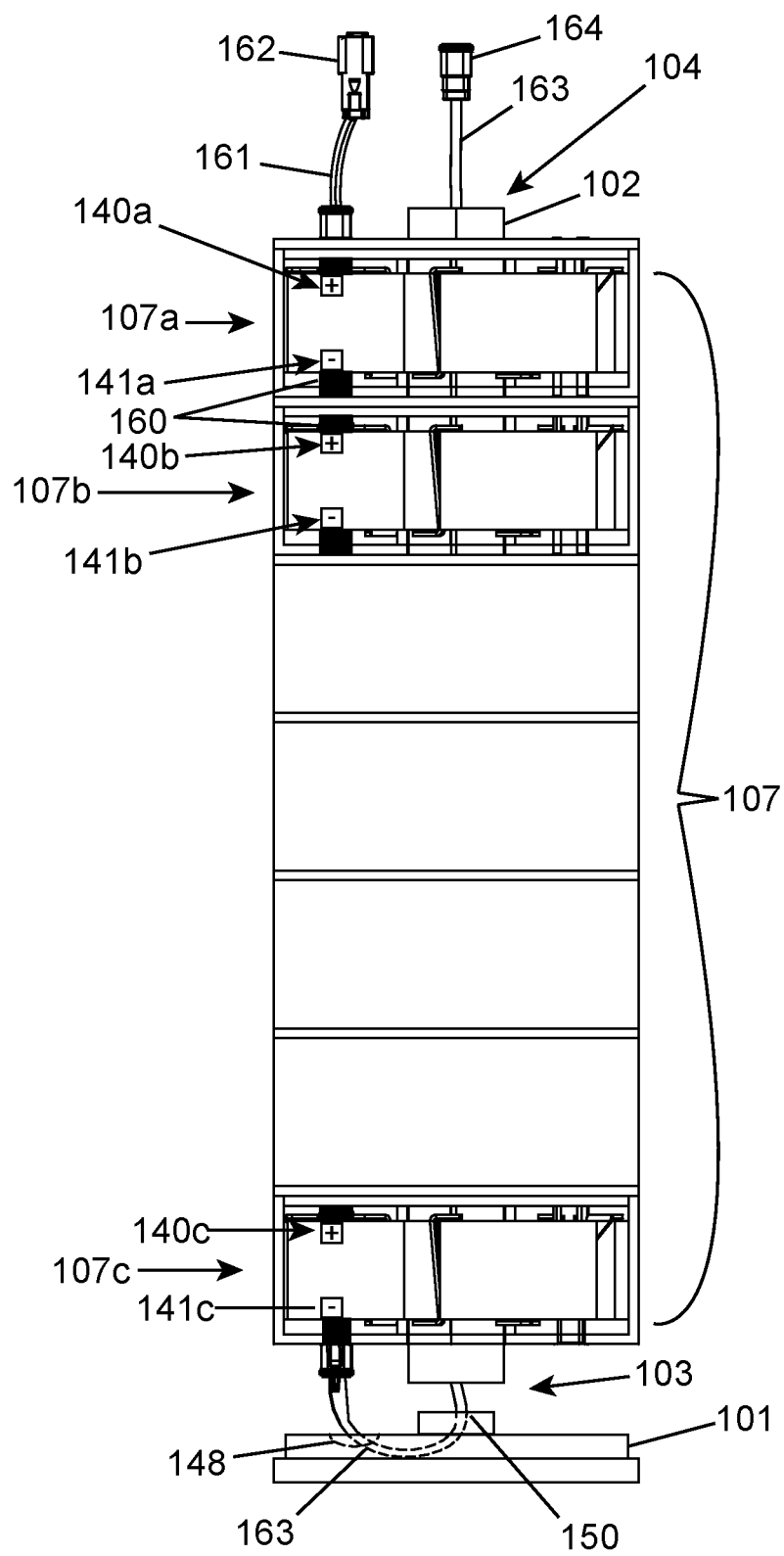
FIG. 2D illustrates a partial cross sectional view of batteries connected in series and disposed around a hollow elongated member, according to an embodiment.

FIG. 2D illustrates the batteries 107 connected in series and disposed around the hollow elongated member 102, according to an embodiment. FIG. 2D is described here in conjunction with the FIGS. 2A-2C. In FIG. 2D, the batteries 107 are shown disposed around the hollow elongated member 102. The top two batteries (shown as batteries 107a, 107b) are represented in cross-sectional view to facilitate understanding of the series connection between the batteries. The battery 107a includes positive and negative terminals 140a,141a serving as the respective positive and negative ends of the battery 107a. The battery 107b includes positive and negative terminals 140b,141b serving as the respective positive and negative ends of the battery 107b. Similarly, the battery 107c includes positive and negative terminals 140c, 141c serving as the respective positive and negative ends of the battery 107c. The positive and negative terminals of each of the batteries 107 can be accessed via the hole 146 (not shown in FIG. 2D) in the cover 134 and the hole 147 (not shown in FIG. 2D) in the base 130 of each respective battery.

To connect the batteries 107a,107b in series, an interconnecting bar 160 is coupled to the positive terminal 141a of the battery 107a and to the negative terminal 140b of the battery 107b. Similar connections are made for the remaining batteries 107 in the stack to provide the series connection. A wire 161 is coupled to the positive terminal 140a of the battery 107a and includes a connector 162, which can serve as one of the positive terminals (or the positive end) for the voltage potential of the entire series configuration. A wire 163 is coupled to the negative terminal 141c the battery 107c and run through the hollow elongated member 102 and out the distal end 104 of the hollow elongated member 102.

The base 101 is shown in FIG. 2D in dotted lines. The base 101 includes the coupling element 150 and the hole 148. The base 101 is at least partially hollow so that the wire 163 can be run from the negative electrode 141c of the battery 107c, through the base 101 via the hole 148 and the coupling element 150, through the hollow elongated member 102, and out the distal end 104 of the hollow elongated member 102. The wire 163 includes a connector 164 that serves as the other terminal (e.g., the negative end) for the voltage potential of the entire series configuration. The connector 162 and 164 are on the same side (e.g., the top) of the structural battery pack so that when the end cap 109 is removed or otherwise opened, both positive and negative terminals (e.g., the connectors 162 and 164) are accessible. The structural battery packs disclosed herein can be configured to have any suitable voltage potential as desired for various applications. Example voltage potentials for the structural battery packs include, but are not limited to, voltage potentials ranging from 9V to 58V, such as 12V, 24V, and 48V. It should be appreciated that structural battery packs can be configured with voltage potentials outside of 9 to 58V without compromising the underlying principles of the disclosure.

Figure 2E:
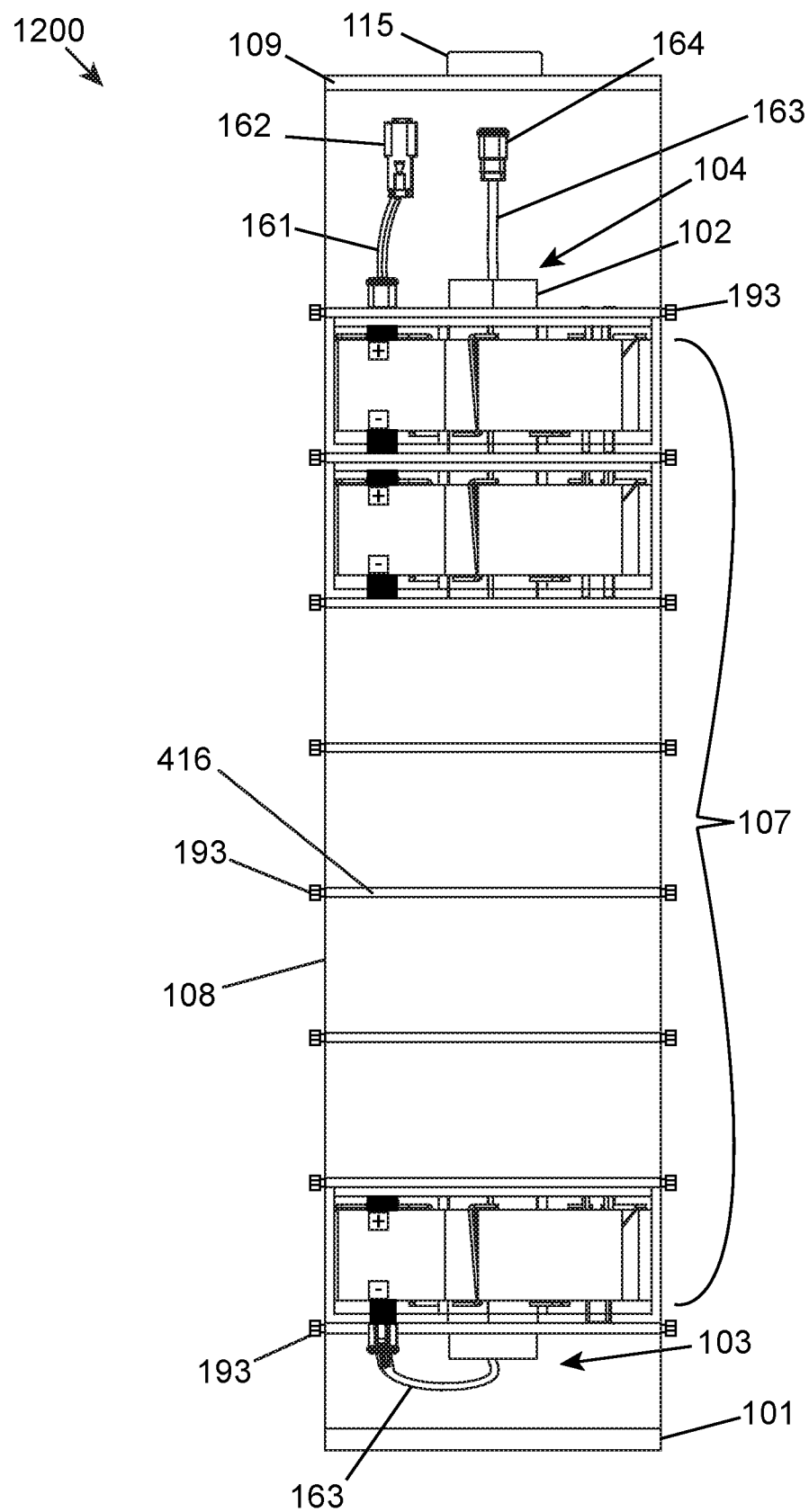
FIG. 2E illustrates a partial cross sectional view of a structural battery pack, according to an embodiment.

In other embodiments, one or more protective inserts (described in further detail in FIGS. 4A-4F) can be coupled or otherwise affixed to the hollow elongated member 102 in a manner that allows it to be secured in the proper position along the hollow elongated member 102. The protective insert 116 can also serve to secure the batteries 107 in place along the hollow elongated member by being positioned on the outside of one or both ends of the batteries 107. The protective insert 116 can also be configured to couple and secure to the hollow elongated shell. FIG. 2E illustrates a partial cross sectional view of a structural battery pack, according to an embodiment. In FIG. 2E, a structural battery pack 1200 is shown including the batteries 107 disposed around the hollow elongated member 102. The configuration of the batteries 107 and the hollow elongated member 102 is essential the same as the configuration shown in FIG. 2D, except that protective inserts 416 are disposed around the hollow elongated member in addition to the batteries. The common features and functions are not repeated here for the sake of brevity. The protective inserts 416 couple to a hollow elongated shell 108 via the coupling elements 193. Additional details for the various embodiments of the protective inserts and the coupling elements 193 are provided in FIGS. 4A-4F. For example, the protective inserts 416 can be the protective inserts 116 in FIGS. 4A-4B, and the coupling elements 193 can be the coupling elements 121 and 323 in FIGS. 4A-4C. In this embodiment, the hollow elongated member 102 and the batteries 107 can be suspended in the interior space of the hollow elongated shell 108 by the protective inserts 416. The base 101 can then be configured to couple to the hollow elongated shell 108 such that there is space between the base 101 and the suspended batteries 107 and hollow elongated member 102. In such case, the hole 148 and the coupling element 150 are not required for the wire 163 to pass through the hollow elongated member 102 and connect to the terminal 141c.

The base 101 and the end cap 109 with the handle 115 are disposed at the respective proximal and distal ends 113,114 of the hollow elongated shell 108 to form the exterior housing of the structural battery pack 100,1200. The hollow elongated shell 108 extends away from the base 101 at its proximal end 113 and away from the end cap 109 at its distal end 114.

The hollow elongated shell 108 has an essentially cylindrical-tube shape, such as with a round pipe, with openings at the proximal and distal ends 113,114. The shape of the hollow elongated shell 108 aligns with (e.g., matches) the base 101 such that the proximal end 113 is closed off by the base 101. For example, the hollow elongated shell 108 has a cylindrical-tube shape with a circular cross-section that aligns with the circular base 101. In another embodiment, the hollow elongated shell 108 has a hexagonal-tube shape that aligns with the base 101 having a hexagonal shape. In other embodiments, hollow elongated shell 108 can have another regular geometric shape (e.g., square-tube shape, oval-tube shape, other polygonal-tube shape, etc.) or irregular shape. The width (e.g., diameter of the circular cross section) of the hollow elongated shell 108 is large enough so that the interior space 112 can fit the batteries 107 and the hollow elongated member. The length of the hollow elongated shell 108 from proximal end 113 to distal end 114 can be approximately the same or longer than the length of the hollow elongated member 102 to properly house the batteries 107. The length can vary based on the number of batteries to be stacked in the structural battery pack.

The hollow elongated shell 108 extends from the base 101 and end cap 109, which together form the exterior housing for the batteries 107 disposed around the hollow elongated member 102. The hollow elongated shell 108 has a cylindrical-tube shape and is disposed around the perimeter of the base 101 and the end cap 109, which have a circular shape. The hollow elongated member 102 is concentrically disposed at the center of the base 101. The hollow elongated shell 108 extends from an outer perimeter 110 of the base 101. The hollow elongated shell 108 can be shaped and sized so that the width (e.g., diameter) of the interior space 112 is slightly larger than the batteries 107 when inside the interior space 112. In this way, minimal space can be maintained between the hollow elongated shell 108 and the batteries 107 to minimize size and provide an additional level of stability by minimizing the potential movement of the batteries 107 within the interior space 112. Example widths (e.g., diameters) of the hollow elongated shell 108 can include, but are not limited, to widths of 3 ft. or less, such as 0.5 ft. to 1.5 ft. Example thicknesses of the hollow elongated shell 108 can include, but are not limited, to thicknesses of 6 in. or less, such as between 0.125 in. and 2 in. The lengths of the hollow elongated shell 108 can vary based on the number of batteries 107 implemented in the set. Example lengths can include, but are not limited, to lengths of 12 ft. or less, such as between 1 ft. and 8 ft. It should be appreciated that widths, thicknesses, and lengths outside of these illustrative example widths, thicknesses, and lengths can be implemented in other embodiments without undermining the underlying principles of the present disclosure.

The end cap 109 is disposed at the distal end 114 of the hollow elongated shell 108. The end cap 109 has a generally circular shape (e.g., a flat or rounded disc shape) that aligns with the shape of the hollow elongated shell 108 having a cylindrical tube shape. The end cap 109 is shaped and sized so as to align with, and secure to, the opening at the distal end 114 of the hollow elongated shell 108. For example, the outer perimeter of the end cap 109 can be coupled (e.g., screwed onto) to perimeter of the distal end 114 of the hollow elongated shell 108. Example widths (e.g., diameters) of the end cap 109 can include, but are not limited, to widths of 3 ft. or less, such as 0.5 ft. to 1.5 ft. Example thicknesses of the end cap 109 can include, but are not limited, to thicknesses of 6 in. or less, such as between 0.p25 in. and 2 in. It should be appreciated that widths and thicknesses outside of these illustrative example widths and thicknesses can be implemented in other embodiments without undermining the underlying principles of the present disclosure.

In other embodiments, the end cap 109 can have a different shape than circular. In an embodiment, for example, the end cap 109 can have a hexagonal shape that aligns with the shape of the hollow elongated shell 108 having a hexagonal-tube shape. In other embodiments, the end cap 109 can have another regular geometric shape (e.g., square, oval, polygon, etc.) or irregular shape.

The end cap 109 can be removably coupled to the distal end 114 of the hollow elongated shell 108 so as to open and securely close. The end cap 109 includes a coupling element (e.g., threading around the perimeter of the end cap 109) that mates with a coupling element (e.g., threading on the inside of the distal end 114) on the hollow elongated shell 108. In this way, the end cap 109 can screw on to the distal end 114 of the hollow elongated shell 108. In other embodiments, the end cap 109 can couple to the hollow elongate shell 108 in a different manner. For example, the end cap 109 and the hollow elongated shell 108 can include a hinge and latch (or clamp) that enables the end cap 109 to open and securely close. Any suitable mechanism can be implemented to enable the end cap 109 to open and securely close. Furthermore, in other embodiments, the end cap 109 and the hollow elongated member 108 can be configured with a locking mechanisms (e.g., lock and key), such as a locking latch, security bar that is bolted to the hollow elongated shell 108 and placed around the end cap 109 to lock the end cap 109 in place, etc. In yet other embodiments, the end cap 109 can be configured to remain fixed to the hollow elongated shell 108. For example, the hollow elongated shell 108 can be welded to the end cap 109. As another example, the hollow elongated shell 108 and end cap 109 can be formed from a molding process so that the two are combined or integrated into unitary piece. In such case, the hollow elongated shell 108 and end cap 109 can be placed over batteries and removably coupled to the base 101. Moreover, a locking mechanism can be included to lock (e.g., locking latch, security bar, etc.) the base 101 with the proximal end 113 of the hollow elongated shell 108.

In FIGS. 2A and 2B, the end cap 109 includes a handle 115. The handle 115 can be used (e.g., by an installation or maintenance technician) to open and close the end cap 109. The handle 115 can also be used to move the structural battery pack, such as during storage or installation, for instance. The handle 115 can be coupled to an exterior surface of the end cap 109 in any suitable manner, such as welding, bolting, molding, etc. In other embodiments, the base can include a handle in addition to, or in place of, the handle 109 on the end cap 109.

The structural battery pack can also include electronics, such a battery management system, that manage the batteries in the structural battery pack. The battery management system can be configured to provide various functions, such as managing the recharging of the batteries, protecting the batteries from operating outside its safe operating are, monitoring and managing the state of the batteries (e.g., voltage, temperature, state of charge, state of health, state of power, state of safety, current, etc.), acquiring data regarding the operation or state of the battery pack assembly, transmitting the data, etc. The electronics can be included in one or more components, modules, circuit boards, etc., and can be disposed within the structural battery pack in any suitable location. Electrical wiring can be coupled to the electronics and the batteries as needed to provide power to the electronics. For example, the electronics can be mounted to the inside of the hollow elongated shell, the end cap, or the base. As another example, the electronics (e.g., circuit board including the battery management system) can be mounted to a board (or platform, container, etc.) that has a through-hole that enables the board to be disposed around the hollow elongated member. In an embodiment, the electronics (e.g., circuit board including the battery management system) is mounted to a protective insert, such as the protective insert 216 of FIG. 4D for instance, and disposed around the hollow elongated member. In another embodiment, the electronics (e.g., circuit board including the battery management system) can be mounted inside the tube pan container (e.g., the base 130, and the inner and outer walls 131,132 of FIG. 1B) of a battery instead of the cell modules or cells. The tube pan container including the electronics can then be disposed around the hollow elongated member, with or without the cover coupled to the tube pan container. The electronics, when installed on the board with the through-hole, on a protective insert, or in a tube pan container), can be disposed around the hollow elongated member in the same manner as the batteries and the protective inserts at the appropriate location along the hollow elongated member as desired.

Figure 3A:
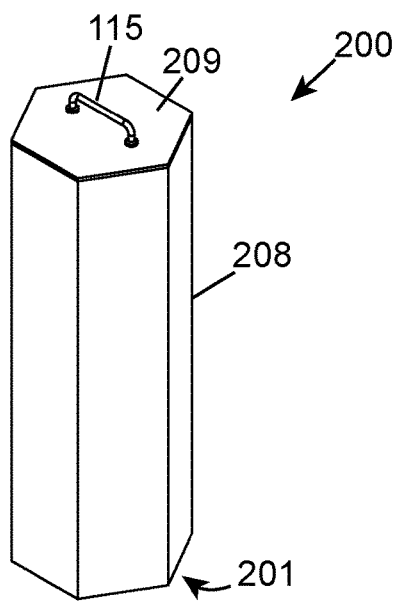
FIG. 3A illustrates a perspective view of an exemplary structural battery pack having a hexagonal-tube shape when assembled, according to an embodiment.

FIG. 3A illustrates a perspective view of an exemplary structural battery pack having a hexagonal-tube shape when assembled, according to an embodiment. In FIG. 3A, a battery-back assembly 200 is shown including a hollow elongated shell 208, an end cap 209 having the handle 115, and a base 201. In an embodiment, the structural battery pack 200 shown in FIG. 3A is essentially the same as the structural battery packs of FIGS. 2A-2E, except that the hollow elongated shell 208 has a hexagonal-tube shape instead of a cylindrical-tube shape, and that the end cap 209 and the base 201 have a hexagonal shape instead of a circular shape. For example, the structural battery pack 200 is shown assembled with the hollow elongated shell 208 extending from the end cap 209 and the base 201, with the hollow elongated member 102 and the batteries 107 (not shown in FIG. 3A) disposed inside the hollow elongated shell 208 in a similar manner as described for FIGS. 2A-2E. For example, the batteries 107 have a cylindrical-tube shape and are sized to fit within the hollow elongated shell 208. For the sake of brevity and clarity, the features and functions common to both structural battery packs 100,200 are not repeated here. In other embodiments than the one shown in FIG. 3A, the structural battery pack 200 can include features that are disclosed herein but different than shown in FIGS. 2A-2E. For example, in an embodiment, the batteries included in the structural battery pack 200 can be hexagonal-tube shaped and large enough to fit within the hollow elongated shell 208 without being able to spin about the hollow elongated member 102.

Figure 3B:
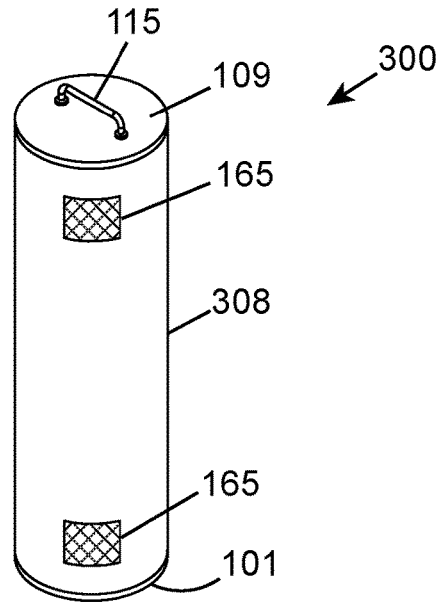
FIG. 3B illustrates a perspective view of an exemplary structural battery pack having air vents, according to an embodiment.

In other embodiments, the hollow elongated shell can include one or more air vents to enable airflow in and out of the structural battery pack for thermal management purposes. FIG. 3B illustrates a perspective view of an exemplary structural battery pack having air vents, according to an embodiment. In FIG. 3B, a battery-back assembly 300 is shown including the hollow elongated shell 308, the end cap 109 having the handle 115, and the base 101. In an embodiment, the structural battery pack 300 is essentially the same as the structural battery pack 100 of FIG. 2A, except that the hollow elongated shell 308 has air vents 165 to promote airflow in and out of the structural battery pack 300.

Figure 4A:
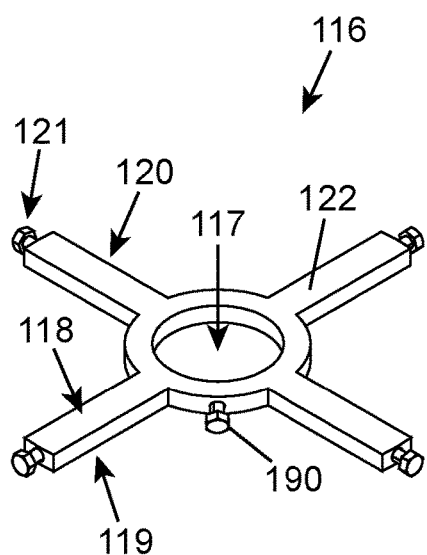
FIG. 4A illustrates a perspective view of an exemplary protective insert, according to an embodiment.
Figure 4B:
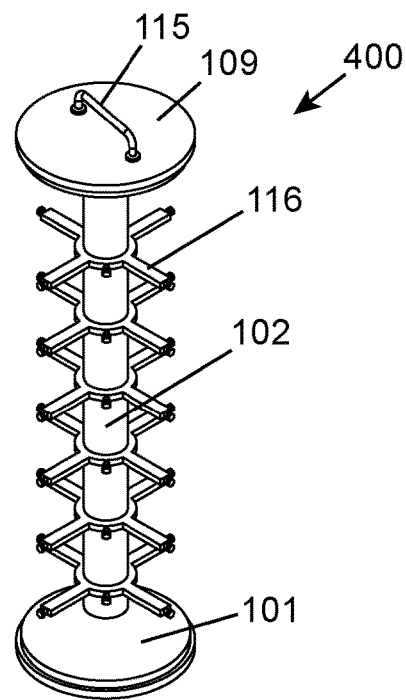
FIG. 4B illustrates a perspective view of multiple protective inserts of FIG. 4A disposed around a hollow elongated member of a structural battery pack, according to an embodiment.

In an embodiment, the structural battery pack can include one or more protective inserts that can provide protective support for impacts encountered by the structural battery pack—e.g., by transferring the load in the event the structural battery pack is dropped. The protective inserts can be disposed around the hollow elongated member 102 in various locations along the hollow elongated member, such as between two batteries 107, between the batteries 107 and the base 101, and between the batteries 107 and the end cap 109. FIG. 4A illustrates a perspective view of a protective insert, according to an embodiment. FIG. 4B illustrates a perspective view of multiple protective inserts of FIG. 4A disposed around a hollow elongated member of a structural battery pack, according to an embodiment. FIG. 4B is described here in conjunction with FIG. 4A. Similar to the structural battery packs 100,1200 of FIGS. 2A-2E, a structural battery pack 400 is shown including the hollow elongated member 102 coupled to the base 101 and the end cap 109 including the handle 115. The hollow elongated shell 108 and the batteries 107 are not shown in FIG. 4B to facilitate understanding, but it should be appreciated that the hollow elongated shell 108 and the batteries 107 are included when the structural battery pack 400 is fully assembled. For the sake of brevity, not all common features and functions from FIGS. 2A-2E are repeated here for FIGS. 4A and 4B.

In FIG. 4A, a protective insert 116 is shown including a body 122 having a through-hole 117. The through-hole 117 is shaped and sized to form fit to the hollow elongated member 102. Multiple protective inserts 116 are shown disposed around the hollow elongated member 102 between the base 101 and the end cap 109. In the embodiment shown, there are six protective inserts 216 disposed around the hollow elongated member 102. It should be appreciated that a different number of protective inserts 116 (i.e., more or less than 6) can be implemented in other embodiments. The protective inserts 216 can be disposed around the hollow elongated member 102 in various locations, such as between two batteries 107, between the batteries 107 and the base 101, and between the batteries 107 and the end cap 109.

When disposed around the hollow elongated member 102, the protective insert 116 extends radially away from the hollow elongated member 102. The protective insert 116 includes an upper surface 118 and a lower surface 119. When disposed between two batteries 107, for instance, the upper surface 118 abuts or faces one battery and the lower surface 119 abuts or faces the other battery. In the embodiment shown, the protective insert 116 includes four arms 120 that extend radially outward from the circular through-hole 117. The arms 120 are patterned to provide strong side-impact robustness. In other embodiments, a different number of the arms 120 (i.e., more or less than 4) can be implemented. The shape of the arms can vary in other embodiments.

The protective inserts 116 are configured to receive the hollow elongated member 102 through the through-holes 117 and slide along the hollow elongated member 102. The protective inserts 116 can be coupled or otherwise affixed to the hollow elongated member 102 in a manner that allows it to be secured in the proper position along the hollow elongated member. For example, the body 122 of the protective insert 116 that forms the through-hole 117 is shown including a threaded bolt (or screw) 190. The threaded bolt 190 can be tightened and extended through the protective insert 116 to secure to the hollow elongated member 102, similar to a screw-based shaft collar. In this way, the protective insert 116 can be secured to the hollow elongated member in the appropriate position as desired. In another embodiment, the protective insert 116 can include a clamp instead of the threaded bolt 190 to function similar to a clamp-based shaft collar. In other embodiments, the protective insert 116 can be welded to the hollow elongated member 102, or secured with one or more separate screw-based or clamp-based shaft collars, when in the proper location. The protective insert 116 can also serve to secure the batteries 107 in place along the hollow elongated member. For example, the protective inserts can be positioned on the outside of one or both ends of the batteries 107 to serve as a securing mechanism to hold the batteries 107 in place along the hollow elongated member 102. In other embodiments, instead of being secured to the hollow elongated member, the protective inserts 116 are maintained in proper position by the two elements that it separates (e.g., between two batteries 107, between the batteries 107 and the base 101, between the batteries 107 and the end cap 109).

Figure 4C:
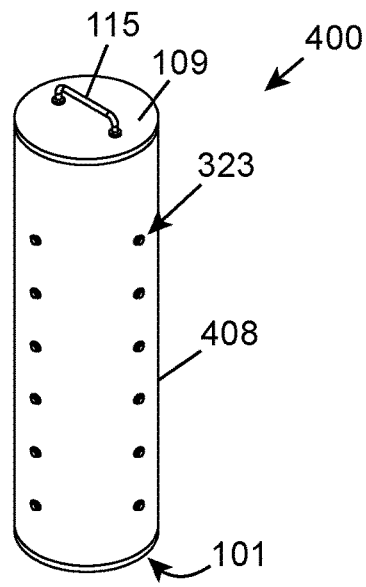
FIG. 4C illustrates a perspective view of the structural battery pack of FIG. 4B when assembled, according to an embodiment.

The structural battery pack 400 can also include a coupling mechanism (e.g., screw, bolt, or other fastener mechanism) that couples the protective insert 116 to the hollow elongated shell 108. For instance, the arms 120 can include a coupling element 121 (e.g., a threaded hole and corresponding screw) that aligns with a coupling element (e.g., holes) on the hollow elongated shell (not shown). FIG. 4C illustrates a perspective view of the structural battery pack 400 of FIG. 4B when assembled, according to an embodiment. FIG. 4C is described here in conjunction with FIGS. 4A and 4B. In FIG. 4C, the structural battery pack 400 is shown assembled and includes the base 101, the end cap 109 having the handle 115, and a hollow elongated shell 408 having coupling elements 323. The coupling elements 323 are configured to mate with the coupling elements 121 of the protective inserts 116 of FIGS. 4A and 4B. For example, the coupling elements 323 of the hollow elongated shell 408 can include holes 323. The screws of the coupling element 121 can be inserted through the holes 323 and screwed into the threaded holes of the coupling element 121 of the protective insert 116. Holes in the hollow elongated shell 308 can be properly located to align with the protective inserts 116 when disposed around the hollow elongated member 102.

Figure 4D:
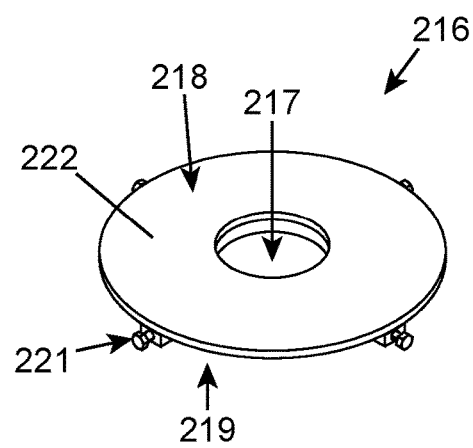
FIG. 4D illustrates a perspective view of an exemplary protective insert, according to an embodiment.

The protective insert 116 can be implemented with a different shape than shown in the embodiment of FIGS. 4A and 4B. FIG. 4D illustrates a perspective view of an exemplary protective insert, according to an embodiment. In FIG. 4D, a protective insert 216 is shown including a circular body 222 having a circular through-hole 217 disposed in the center of the body 222. The protective insert 216 has a generally flat disc shape with the circular through-hole 217 in its center. The protective insert 216 includes two flat surfaces corresponding to an upper surface 218 and a lower surface 219. When disposed between two of the batteries 107, for instance, the upper surface 218 abuts or faces one battery and the lower surface 219 abuts or faces the other battery. The protective insert 216 includes coupling elements 221 that are used to couple the protective insert 216 to the hollow elongated shell 408. For instance, an outer perimeter of the body 222 of the protective insert 216 can include one or more threaded holes (and corresponding screws) that align with the coupling element 323 (e.g., holes) of the hollow elongated shell 408.

Figure 4E:
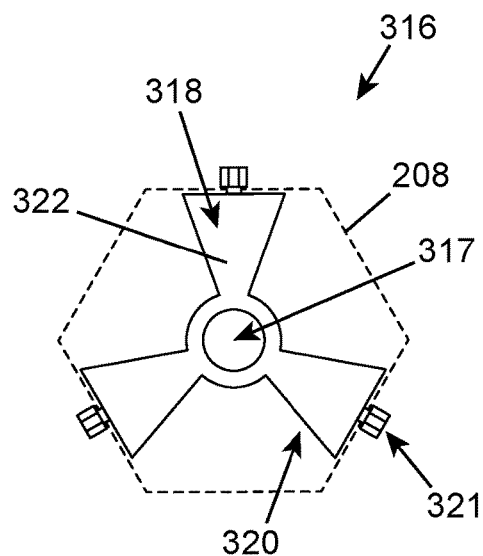
FIG. 4E illustrates a top view of an exemplary protective insert, according to an embodiment.

It should be appreciated that the protective inserts 116,216 can be implemented in a structural battery pack having a different tubular shape, such as hexagonal-tube shape, square tube shape, etc. In such case, the protective inserts 116,216 can be appropriately sized to fit within the structural battery pack having a shape other than cylindrical-tube shape, such as the hexagonal tube shape of the structural battery pack 200 in FIG. 3A. The protective inserts can also have another suitable shape in other embodiments. FIG. 4E illustrates a top view of an exemplary protective insert that can be implemented in the hexagonal tube shape of the structural battery pack 200 in FIG. 3A, according to an embodiment. In FIG. 4E, a protective insert 316 includes a body 322 having a through-hole 317 that is shaped and sized to form fit to the hollow elongated member 102 (not shown in FIG. 4E) that has a cylindrical-tube shape. When disposed around the hollow elongated member 102, the protective insert 316 extends radially away from the through-hole 317 and the hollow elongated member 102. The protective insert 316 includes an upper surface 318, a lower surface (not shown), and three arms 320. When disposed between two batteries 107, for instance, the upper surface 318 abuts or faces one battery and the lower surface 319 abuts or faces the other battery. The surface areas of the arms 320 are shown to increase in width as the arms 320 extend radially outward from the through-hole 317. This can provide additional stability for the battery 107 when abutted against the protective insert 316.

Figure 4F:
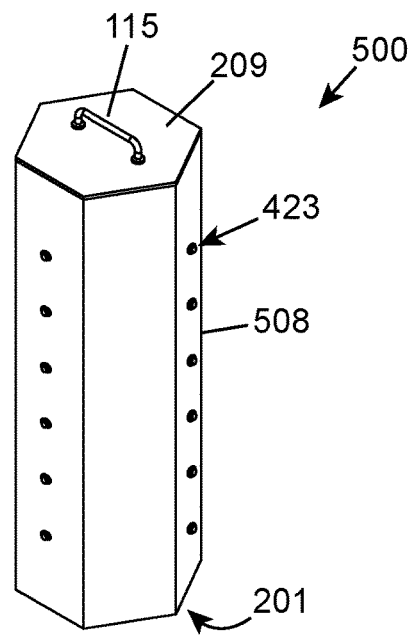
FIG. 4F illustrates a perspective view of an exemplary structural battery pack having a hollow elongated shell that has a hexagonal-tube shape and includes coupling elements, according to an embodiment.

In an embodiment, the protective insert 316 includes coupling elements 321 to couple the protective insert 316 to the hollow elongated shell 208 having a hexagonal tube shape, as represented by the dotted line 324. For instance, the arms 320 can include the coupling elements 321 (e.g., a threaded holes and corresponding screws) at an end of the arms 320 distal to the through-hole 317. The coupling elements 321 can be aligned with coupling elements (e.g., holes) in the hollow elongated shell 208 having a hexagonal-tube shape. FIG. 4F illustrates a perspective view of a structural battery pack having a hollow elongated shell that is hexagonal tube shaped and includes coupling elements, according to an embodiment. In FIG. 4F, a structural battery pack 500 is shown assembled and includes the base 201, the end cap 209 having the handle 115, and a hollow elongated shell 508 having coupling elements 423 disposed therein. The coupling elements 423 are configured to mate with the coupling elements 321 of the protective inserts 316. For example, the arms 320 can include a threaded hole 321 at its distal end that is distal to the through-hole 317. The coupling elements 423 of the hollow elongated shell 508 can include holes that are disposed in the hollow elongated shell 508. The holes 423 in the hollow elongated shell 508 can be positioned to align with the coupling elements 321 of the protective insert 316. The screws of the coupling element 321 can be inserted through the holes 423 in the hollow elongated shell 508 and screwed into the threaded holes 321 in the protective insert 316.

In an embodiment, the structural battery pack 500 is the same as the structural battery pack 200 of FIG. 3A, except that the structural battery pack 500 includes the protective inserts 316 and the hollow elongated shell 408 that has the coupling elements 423. In other embodiments, the through-hole 417 is a shape other than circular (e.g., square, triangular, etc.) to appropriately form fit to a differently shaped hollow elongated member 102 (e.g., square-tube shape, triangular-tube shape, etc.).

The structural battery pack (e.g., the base 101, the hollow elongated member 102, the hollow elongated shell 108, the end cap 109, the handle, and the protective inserts 116) can be made from any suitable material that is sufficiently strong and durable so as to support and protect the batteries within the structural battery pack. Example materials can include, but are not limited to, one or more metals, metal alloys, polymeric material, or combination thereof. In an embodiment, for example, the base, the hollow elongated member, the hollow elongated shell, and the end cap are made of steel, stainless steel, aluminum, or a combination thereof. In an embodiment, a coating (e.g., a polymeric material) is also applied to provide additional protection from weather (rain, sun, fire, etc.), scratches, denting, etc. In an embodiment, a coating (e.g., rubber or other polymeric material) can be applied to an interior surface of the hollow elongated shell to provide additional protection (e.g., cushioning) or limit movement of the batteries when inside the hollow elongated shell.

During assembly of the structural battery packs (e.g., the structural battery pack 100, 200, 300, 400, 500, or 1200), a hollow elongated member (e.g., the hollow elongated member 102) is provided that includes an interior space between its two ends. For example, the hollow elongated member can be formed from an extrusion process. One of the batteries (e.g., the batteries 107, 207, or 307) can be disposed around the hollow elongated member by inserting the hollow elongated member (e.g., the distal end 104) through the through-hole (e.g., the through-hole 111). The battery can then be slid along the hollow elongated member (e.g., towards the proximal end 103 of the hollow elongated member). A second battery can then be disposed around the hollow elongated member in a similar manner and stacked next to the first battery. The holes (e.g., the hole 146 or 147) in the cover (e.g., the cover 134 or 334) and the base (e.g., the base 130 or 330) of the two batteries can be aligned and an interconnecting bar (e.g., the interconnecting bar 150) coupled to the appropriate terminals of the two batteries to connect them in series (or any other configuration as desired, such as in parallel or combination of series and parallel). The process can be repeated until all batteries are disposed around the hollow elongated member and stacked between the proximal and distal ends (e.g., the proximal and distal ends 103,104) of the hollow elongated member 102 in a series connection. In an embodiment, a screw-based or clamp-based shaft collar can be secured around one or both ends of the hollow elongated member to secure the batteries in place on the hollow elongated member. If protective inserts (e.g., the protective insert 116, 216, or 316) are implemented, the protective inserts are disposed around the hollow elongated member in the appropriate order with the batteries to position the protective inserts where desired. The screw-based or clamp-based shaft collar can be used to secure the batteries and the protective inserts in place on the hollow elongated member. In some instances, the protective inserts can be removably fixed (e.g., via as screw-based or clamp-based shaft collar mechanism) to the appropriate location on the hollow elongated member.

Once the batteries are stacked and connected in series, a wire (e.g., the wire 163) can be run through the interior space (e.g., the interior space 105) of the hollow elongated member, with a connector (e.g., the connector 164) maintained out the distal end of the hollow elongated member. The wire can then be run through the base (e.g., the base 101 or 201). For example, in the embodiment of FIG. 2D, the wire 163 can be run through the coupling element 150 and the hole 148 in the base 101. The base 101 can then be coupled to the hollow elongated member 102 in any suitable manner that securely or stably couples the two together. For example, the hollow elongated member 102 can include a coupling element (e.g., threading on its proximal end) that can be mated with (e.g., screw onto) the coupling element 150 (e.g., a threaded protrusion or recess) on the base 101. In another embodiment, the hollow elongated member can be welded to the base 101 before or after the cabling is run through the hollow elongated member and the base 101. In yet another embodiment, the hollow elongated member and base 101 can be formed from an extrusion or molding process so that the two are integrated together as a unitary piece. The hole 148 can then be formed in the unitary piece to provide a channel through the base 101 to the interior 105 of the hollow elongated member 102. The wire 163 can then be run through the base 101 and the hollow elongated member 102 accordingly. Once the base 101 is coupled to the hollow elongated member as desired, the wire 163 can be coupled to the appropriate terminal (e.g., negative terminal) of the bottommost battery (e.g., the bottommost battery 107) that serves as one end (e.g., the negative end) of the voltage potential for the series connection of the batteries. Similarly, a wire (e.g., the wire 161) and a connector (e.g., the connector 162) can be coupled to the appropriate terminal (e.g., positive terminal) of the topmost battery (e.g., the topmost battery 107) that serves as the other end (e.g., the positive end) of the voltage potential for the series connection of the batteries.

The hollow elongated shell (e.g., the hollow elongated shell 108, 208, 308, 408, and 508) can then be placed over the distal end of the hollow elongated member and the batteries. If the protective inserts are implemented, the hollow elongated shell can be oriented such that the coupling elements (e.g., the coupling elements 323 or 423) align with the coupling elements (e.g., the coupling elements 121, 221, or 321) of the protective inserts. For example, the holes 323 of the hollow elongated shell 408 can be aligned with the threaded holes of the coupling elements 121 of the protective inserts 116. The screws of the coupling elements 121 can then be inserted through the holes 323 of the hollow elongated shell 408 and screwed into the threaded holes of the coupling elements 121 to secure the hollow elongated shell 408 to the protective inserts 116. The screws of the coupling elements 121 can be removed when the hollow elongated shell 408 needs to be removed, such as during repairs, maintenance, troubleshooting, etc.

The base (e.g., the base 101 or 201) can then be coupled to (e.g., screwed onto, pressure fit onto, welded to, latched to, etc.) the proximal end of the hollow elongated shell. The end cap (e.g., the end cap 109 or 209) can then be removably coupled to (e.g., screwed onto, pressure fit onto, latched to, etc.) the distal end of the hollow elongated shell. In this way, for example, the hollow elongated shell extends away from the base 101 to its distal end 114, and away from the end cap 109 to its proximal end 113. Also, the hollow elongated member 102 extends away from the end cap to its proximal end 103, which is distal to the end cap 109. The batteries are disposed on the hollow elongated member 102 between the end cap 109 and the base 101. The hollow elongated shell 108 can be coupled to base 101 and the end cap 109 in any suitable manner that securely or stably couples them together. For example, the hollow elongated shell 108 can include a coupling element (e.g., threading on its distal and proximal end) and mate with (e.g., screw onto) a corresponding coupling element (e.g., threaded protrusion or recess) on the base 101 and the end cap 109. In an embodiment, a locking mechanisms (e.g., lock and key) can be implemented, such as a locking latch, security bar that is bolted to the hollow elongated shell 108 and placed around the end cap 109 or the base 101, etc. The locking mechanism can be activated to lock the structural battery pack during storage.

In another embodiment, the batteries are disposed around the hollow elongated member and connected by the interconnecting bars. The protective inserts can also be coupled to the hollow elongated member in the appropriate locations. Protective inserts are coupled to the outside of each end of the batteries to secure the batteries in place along the hollow elongated member. The hollow elongated shell can then be placed over the hollow elongated member and the batteries. For example, the hollow elongated shell 108 can be oriented such that the coupling elements 323 (or the coupling elements 423) align with the coupling elements 121 (or the coupling elements 221 and 321) of the protective inserts. The screws of the coupling elements 121 can then be inserted through the holes 323 of the hollow elongated shell 408 and screwed into the threaded holes of the coupling elements 121 to secure the hollow elongated shell 408 to the protective inserts 116. In this way, the hollow elongated member and the batteries 107 are suspended in the hollow elongated shell by the protective inserts. The wire 163 can then be run through the interior space 105 of the hollow elongated member 102, with the connector 164 maintained out the distal end 104 of the hollow elongated member 102. The end of the wire 163 at the proximal end 104 of the hollow elongated member 102 can be coupled to the appropriate terminal (e.g., negative terminal) of the bottommost battery 107 that serves as one end (e.g., the negative end) of the voltage potential for the series connection of the batteries 107. Similarly, the wire 161 and the connector 162 can be coupled to the appropriate terminal (e.g., positive terminal) of the topmost battery 107 that serves as the other end (e.g., the positive end) of the voltage potential for the series connection of the batteries 107. Both connectors 162 and 164 are positioned on the same side of the batteries 107. The base can then coupled to the hollow elongated shell with space between the base and the suspended batteries and hollow elongated member. For instance, the space allows the wire 163 to run through the hollow elongated member 102 and to the appropriate terminal (e.g., negative terminal) of the bottommost battery 107, without having to enter the base. The base 101 is thus not directly connected to the hollow elongated member 102, but rather coupled to the hollow elongated member via the hollow elongated shell and protective inserts. The end cap can then be coupled to the other end of the hollow elongated shell.

In use, the structural battery pack can be stored once assembled. The thin and compact form factor of the structural battery packs allow for efficient and space-saving storage. The handle 115 facilitates handling and transportation of the structural battery pack to storage or a desired installation location, such as a cell site, lamppost, etc. Once the structural battery pack is positioned in the desired location, the end cap can be removed to gain access to the connectors 162,164 serving as the positive and negative terminals of the structural battery pack. The load at the desired location can then be coupled to the connectors 162,164 to power the load with the structural battery pack. The structural battery pack can also be bolted to the ground or another object to secure the battery at the desired location. For example, the base can be configured with holes and bolted to the ground or surface of an object. This can also aid in theft prevention.

In another embodiment, a structural battery pack includes a hollow elongated member that extends out of the base and/or the end cap. FIG. 5A illustrates a structural battery pack 600 having a hollow elongated member 602 extending out of its housing. In FIG. 5A, a structural battery pack 600 is shown including a hollow elongated member 602 and batteries 607 disposed around the hollow elongated member 602. The protective inserts disclosed herein can also be coupled or otherwise affixed to the hollow elongated member 102 in a manner that allows it to be secured in the proper position along the hollow elongated member, such as described for FIG. 2D. The protective inserts can also serve to secure the batteries 107 in place along the hollow elongated member. For example, the protective inserts can be positioned on the outside of one or both ends of the batteries 107 to serve as a securing mechanism to hold the batteries 107 in place along the hollow elongated member 102.

The batteries 607 are shown connected in series. In other embodiments, the batteries can be connected in a different configuration, such as in parallel or in a parallel and series combination. The features and functions of the batteries 107,207 describe for FIGS. 1A-1E and 2A-2E can be applicable here for the battery 607 of FIG. 5A. The common features and function of the batteries 107,207 and the battery 607 of FIG. 5A are not repeated here for the sake of brevity. The interconnecting bars 160 are shown coupled to the batteries 107 to form the series connection. A wire 161 is coupled to the positive terminal of the topmost battery 607 and includes the connector 162 that serves as the positive terminal (or the positive end) of the entire series configuration. A wire 163 is coupled to the negative terminal of the bottommost battery 607 and runs through the hollow elongated member 102. The wire 163 includes the connector 164 that serves as the other terminal (e.g., the negative end) of the entire series configuration. The hollow elongated member 602 is configured to extend through the base 601 and the end cap 609. FIG. 5B illustrates a perspective view of the end cap and the base of FIG. 5A, according to an embodiment. In FIG. 5B, the end cap 609 and the base 601 include a body 680 including a through-hole 681 concentrically disposed in the center of the body 680. The through-hole 681 is shaped and sized to fit the hollow elongated member 608 within the through-hole 681. The through-hole 681 can be sized to be slightly larger than the hollow elongated member 608 to allow the hollow elongated member 608 to slide within the though-hole 681 with minimal to no wobble. For the end cap 609, the through-hole 681 allows the wire 161 and connector 162 to couple to the positive terminal of the topmost battery 607 that serves as the positive terminal (e.g., the positive end) of the entire series configuration. For the base 601, the through-hole 681 can be used to allow the wire 163 to couple to the negative terminal of the bottommost battery 607 that serves as the negative terminal (e.g., the negative end) of the entire series configuration. The base 601 and the end cap 609 can be coupled to the hollow elongated shell 608 in any suitable manner, such as the example coupling mechanisms previous described herein for the base and the end cap. For instance, the base 601 and the end cap 609 can be configured to screw onto, pressure fit onto, latch onto, or otherwise mount to, the hollow elongated shell 608.

The assembly of the structural battery pack 600 of FIG. 5A is similar to the assembly of the structural battery packs (e.g., the structural battery packs 100 or 1200) previously described. For the sake of brevity, the common operations are summarized for description of the assembly of the structural battery pack 600. During assembly, a hollow elongated member 602 is provided that includes an interior space between its two ends. For example, the hollow elongated member can be formed from an extrusion process. The batteries 607 and protective inserts, if implemented, can be disposed around the hollow elongated member 602 by inserting the hollow elongated member 602 through the through-holes of the batteries and protective inserts. The batteries and the protective inserts can be and slid along the hollow elongated member 602 (e.g., from its distal end 604 towards its proximal end 603). The holes (not shown) in the cover and the base of the batteries 607 can be aligned for each successive battery, and the interconnecting bars 160 can be coupled to the appropriate terminals of the successive batteries to connect them in series (or any other configuration as desired, such as in parallel or combination of series and parallel). The batteries 607 are disposed around the hollow elongated member 602 and stacked between the proximal and distal ends of the hollow elongated member 602 in a series connection. In an embodiment, a screw-based or clamp-based shaft collar can be secured around one or both ends of the hollow elongated member to secure the batteries in place on the hollow elongated member. Once the batteries are stacked and connected in series, the hollow elongated shell 608 can then be placed over the hollow elongated member 602 and the batteries 607. If, for example, the protective inserts are implemented, the hollow elongated shell 608 can be oriented such that the coupling elements 323 (or the coupling elements 423) align with the coupling elements 121 (or the coupling elements 221 and 321) of the protective inserts. The coupling elements 121 can then be mated with the coupling elements 121 to secure the hollow elongated shell 608 to the protective inserts 116. The base 601 and the end cap 609 can then be coupled to the ends of the hollow elongated shell 608 with the ends of the hollow elongated member 602 extending through (or approximately to) the through-holes 681 of the end cap 609 and the base 601. The end cap 609 and the base 601 can be coupled to the hollow elongated shell 608 in any suitable manner that securely or stably couples them to the hollow elongated shell 608—e.g., screwed onto, pressure fit onto, welded to, latched to, etc. The wire 163 can then be run through the interior space of the hollow elongated member 602 with the connector 164 maintained out the distal end of the hollow elongated member 602. The wire 163 can be coupled to the appropriate terminal (e.g., negative terminal) of the bottommost battery 607 that serves as one end (e.g., the negative end) of the voltage potential for the series connection of the batteries 607. Similarly, the wire 161 and the connector 162 can be coupled to the appropriate terminal (e.g., positive terminal) of the topmost battery 607 that serves as the other end (e.g., the positive end) of the voltage potential for the series connection of the batteries 607. The structural battery pack 600 is assembled and ready for use. In use, the structural battery pack 600 can be installed at a desired location, such as a cell site, lamppost, etc. Once the structural battery pack 600 is positioned in the desired location, the load at the desired location can be coupled to the connectors 162,164 to power the load with the structural battery pack.

In other embodiments, the structural battery pack 600 of FIG. 5A can be assembled without the hollow elongated shell 608. In such case, the end cap 609 and the base 601 can be securely coupled to the hollow elongated member 602. Any suitable coupling mechanism can be implemented to secure the end cap 609 and the base 601 to the hollow elongated member 602. For example, a screw-based or clamp-based shaft collars can be inserted over the hollow elongated member 602 outside of the end cap 609 and the base 601. The shaft collars can be secured to the hollow elongated member 602 such that the batteries 607, the end cap 609, and the base 601 remain stably stacked together.

While embodiments of the structural battery packs shown in the figures are described herein with reference to an exemplary battery (e.g., the battery 107), an exemplary hollow elongated member (e.g., the hollow elongated member 102), an exemplary hollow elongated shell (e.g., the hollow elongated shell 108), an exemplary protective insert (e.g., the protective insert 116), etc., it should be appreciated that other suitable batteries, hollow elongated members, hollow elongated shells, protective inserts, etc., as described herein may also be applicable and can be implemented in other embodiments.

Figure 6:
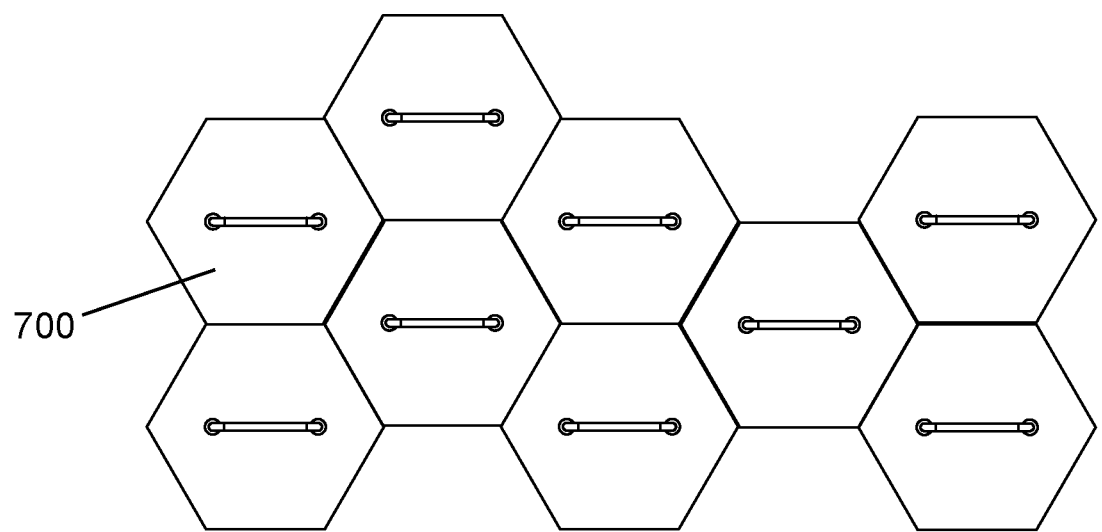
FIG. 6 illustrates an exemplary arrangement for storing structural battery packs, according to an embodiment.

The structural battery packs discussed herein can be beneficial for various reasons depending on the application. For example, the structural battery packs may be able to reduce the complexity of manufacturing and lower cost. For instance, the tubular shape of the hollow elongated shells 108,208 (and the hollow elongated member 102) may simplify and reduce manufacturing cost since tubes (e.g., cylindrical, hexagonal, etc.) are easily made (e.g., via an extrusion process) and readily available. Furthermore, the structural battery packs may allow for easy and efficient storage. For example, the structural battery packs are compact and have a tall and thin form factor. The structural battery packs can be stood vertically (or upright) to keep the necessary surface area low. In this way, more structural battery packs can be stood upright and stored together to lower the total surface area needed for storage. The structural battery packs having a hexagonal-tube shape may provide an optimal space saving storage capability since the hexagonal shape can efficiently and compactly fit together. FIG. 6 illustrates an exemplary arrangement for storing structural battery packs, according to an embodiment. In FIG. 6, a group of structural battery packs 700 having a hexagonal-tube shape is shown stacked together during storage. In an embodiment, the structural battery packs 700 can be the structural battery packs 200 and 500 of FIGS. 3A and 4F, respectively. The hexagonal-tube shape allows the structural battery packs 700 to be densely packed in an optimal space saving manner. The structural battery packs 700 can be stacked vertically (i.e., standing on the base) or horizontally (i.e., laying on the hollow elongated shell) and still maintain the optimal space saving characteristics. Furthermore, the structural battery packs 700 can be can be stacked in an energy-dense manner at an installation site, such as on the ground or in an equipment shelter housing at a cellular tower site.

Figure 7:
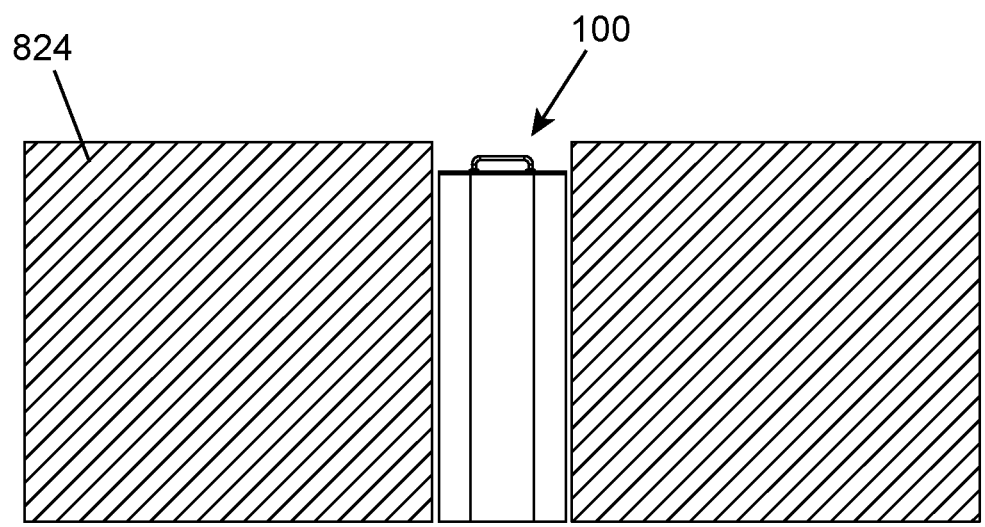
FIG. 7 illustrates the structural battery pack of FIG. 2A buried in the ground, according to an embodiment.

In addition, the structural battery packs may facilitate installation in sites where it is difficult or impossible through traditional methods. For example, cell tower sites are often limited by the surface area upon which equipment can be installed, whether on a hillside, in dense areas of vegetation, on a roof of a building, etc. The structural battery packs have a tall and thin form factor that allows it to stand vertically, keeping the necessary surface area low. Moreover, the structural battery packs can be buried vertically to keep the necessary ground (or surface) area low. A buried batter-pack assembly may have various benefits, such as being inconspicuous (e.g., kept out of site for aesthetic purposes or theft prevention), being protected from fires in the surrounding environment, etc. FIG. 7 illustrates the structural battery pack 100 of FIG. 2A buried in the ground 824, according to an embodiment. Any other batter-pack assembly described herein can also be similarly buried in the ground 824.

Figure 8:
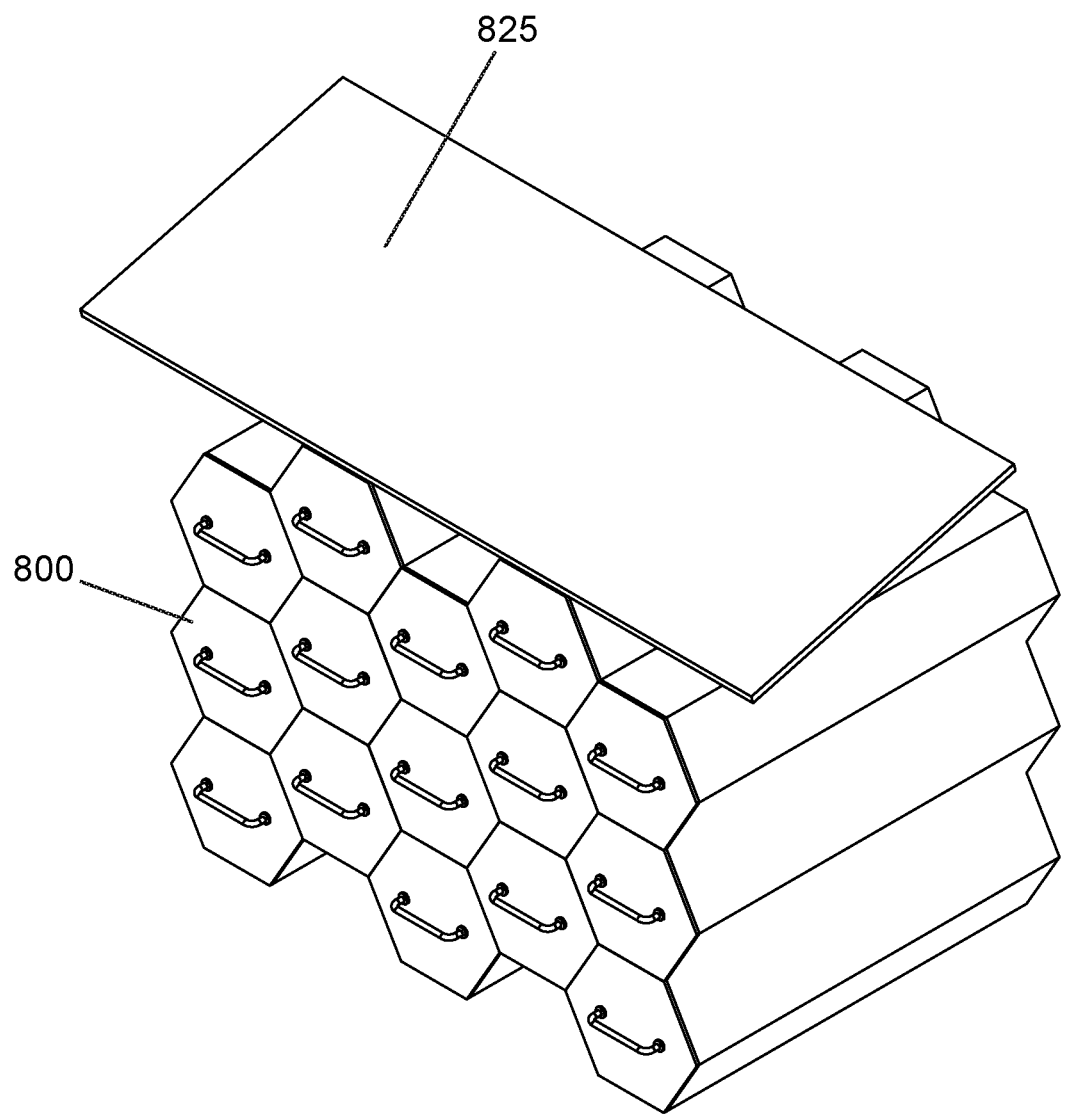
FIG. 8 illustrates a perspective view of a group of battery pack assemblies used to power and structurally support a solar panel array, according to an embodiment.

The structural battery packs may provide structural value to installation sites. FIG. 8 illustrates a perspective view of a group of battery pack assemblies used to power and structurally support a solar panel array, according to an embodiment. In FIG. 8, a group of structural battery packs 800 are stacked horizontally on the ground (or other surface). The hexagonal-tube shape of the structural battery packs 800 not only provide an optimal arrangement to save space, but also provide a flat top surface that can serve as structural support for a solar panel array 825. The solar panel array 825 can be disposed on the top of the structural battery packs 500 for storage purposes, or to electrically couple to the structural battery packs 800 for charging purposes.

FIG. 9A illustrates a perspective view of a lamppost including a structural battery pack included within a base of the lamppost, according to an embodiment. FIG. 9B illustrates a close-up cross-sectional view of the base of FIG. 9A, according to an embodiment. FIG. 9B is described here in conjunction with FIG. 9A. A lamppost 626 is shown including a base 627, a pole 628 coupled to the base, and a lighting element 629 coupled to the pole 628. The base 627 includes a housing 630, which is shown as having a cylindrical-tube shape. The housing 630 of the base 627 is shown as see-through in FIG. 9B to facilitate understanding. A structural battery pack 900 is disposed within an interior of the housing 630. The structural battery pack 900 can be installed without an end cap to provide access to the terminals of the structural battery pack 900. Alternatively, the end cap can include a through-hole to enable access to the terminals of the batter-pack assembly 900, such as with the end cap and the base shown in FIG. 5B for instance. The structural battery pack 900 includes a hollow elongated shell 908 coupled to a base 901. The batteries 907 are disposed around a hollow elongated member 902 within the hollow elongated shell 908. Electrical wiring (not shown) can be coupled to the structural battery pack 900 and run through the pole 628 to the lighting element 629 to power the lighting element 629 with the structural battery pack 900. In an embodiment, the structural battery pack 900 is configured as the sole source of power to the lighting element 629. In another embodiment, the electrical wiring is also coupled to another source of power, such as the grid, and the structural battery pack 900 is configured to provide back-up power when needed. The structural battery pack 900 provides battery power and serves as structural support for the lamppost 626 in a discreet manner, which can be beneficial for aesthetic purposes, theft prevention purposes, or space saving purposes. Furthermore, being internal to the base 627, additional equipment (e.g., mounts, fasteners, etc.) is not required to externally secure a battery pack to the lamppost 626. In the embodiment shown, the structural battery pack 900 has a hexagonal-tube shape. In other embodiments, the structural battery pack 900 can have a different shape, such as a cylindrical-tube shape. Any of the structural battery packs discussed herein are applicable and could be disposed with the base 627. Solar panels (not shown) can also be coupled to the lamppost 626 (e.g., at top of the pole 628) and electrically coupled to the structural battery pack 900 to charge the structural battery pack 900.

Figure 10:
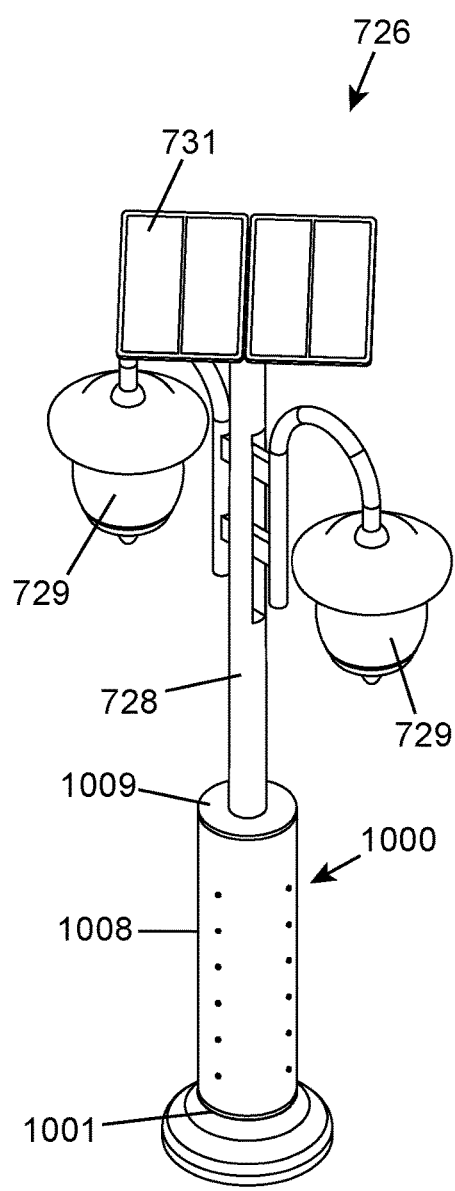
FIG. 10 illustrates a perspective view of an exemplary lamppost including a structural battery pack as its base, according to an embodiment.

FIG. 10 illustrates a perspective view of an exemplary lamppost including a structural battery pack as a base of the lamppost, according to an embodiment. In FIG. 10, a lamppost 726 is shown including the structural battery pack 1000 as its base, a pole 728 coupled to the structural battery pack 1000, and lighting elements 729 coupled to the pole 728, and one or more solar panels 731 coupled to the top of the pole 728. The structural battery pack 1000 is used as the base of the lamppost 726. The structural battery pack 1000 includes a hollow elongated shell 1008 coupled to an end cap 1009 and a base 1001. The end cap 1009 includes a through-hole to enable access to the terminals of the batter-pack assembly 1000, such as with the end cap and the base shown in FIG. 5B for instance. The pole 728 can be configured to mount to the end cap 1009 in any suitable manner, such as by screwing onto the end cap 1009, bolting onto the end cap 1009, etc. Electrical wiring (not shown) can be coupled to the structural battery pack 1000 and run through the pole 728 to the lighting elements 729 to power the lighting elements 729 with the structural battery pack 1000. The electrical wiring can also be coupled to the solar panels 731 to enable the solar panels 731 to charge the structural battery pack 1000. In an embodiment, the structural battery pack 1000 is configured as the sole source of power to the lighting elements 729. In another embodiment, the electrical wiring is also coupled to another source of power, such as the grid, and the structural battery pack 1000 is configured to provide back-up power when needed. The structural battery pack 1000 provides battery power and serves as structural support for the lamppost 726 in a discreet manner, which can be beneficial for aesthetic purposes, theft prevention purposes, or space saving purposes. Furthermore, additional equipment (e.g., mounts, fasteners, etc.) is not required to externally secure the battery pack assembly to the lamppost 726. In the embodiment shown, the structural battery pack 1000 has a cylindrical-tube shape. In other embodiments, the structural battery pack 1000 can have a different shape, such as a hexagonal-tube shape. Any of the structural battery packs discussed herein are applicable and could be used as the base 727.

Figure 11:
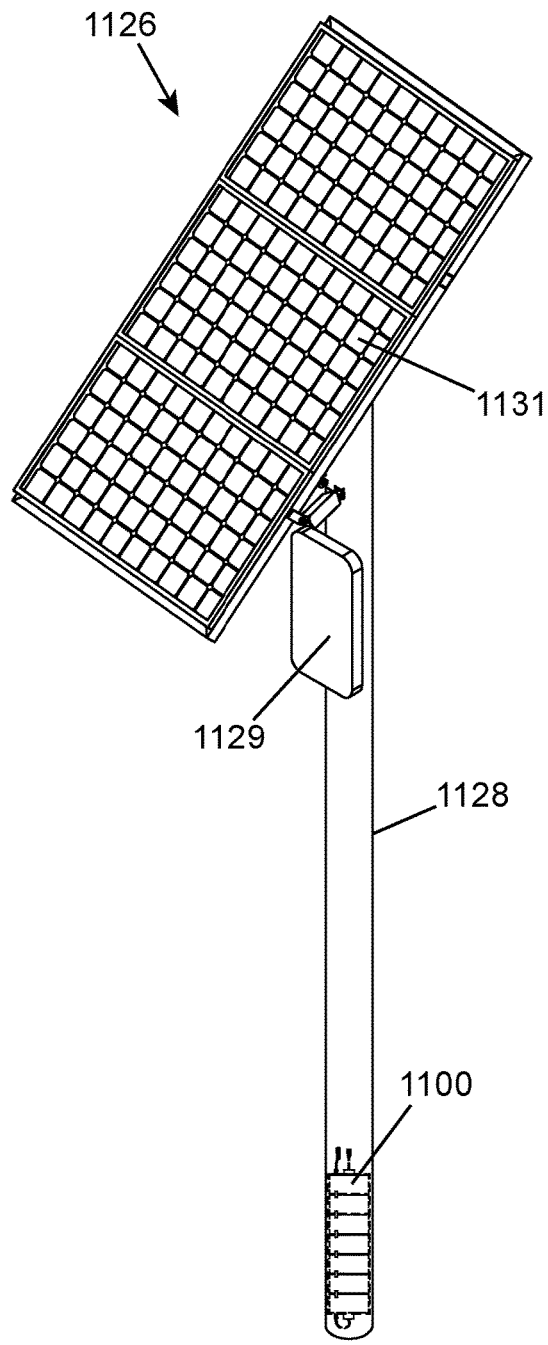
FIG. 11 illustrates a perspective view of an exemplary microcell site including a structural battery pack, according to an embodiment.

The structural battery packs disclosed herein can also be implemented in a cell site (or cell tower) of various types and sizes, such as a macro cell sites, micro cell sites, rooftop sites, outdoor distributed antenna system (ODAS) sites, etc. FIG. 11 illustrates a perspective view of an exemplary microcell site including a structural battery pack, according to an embodiment. A microcell site 1126 is shown including a pole 1128, cellular panel 1129 coupled to the pole 1128, and one or more solar panels 1131 coupled to the pole 1128. The cellular panel 1129 can include various components, such as a transceiver, power amplifier, rectifiers, processors, controllers, etc. A structural battery pack 1100 is disposed inside the pole 1128. While the structural battery pack is shown at the base of the pole 1128, it can also be installed off the ground (e.g., secured with horizontal fasteners, or any other suitable mounting mechanism) in other embodiments. Electrical wiring (not shown) can be coupled to the structural battery pack 1100 and run through the pole 1128 to the cellular panel 1129 to power the cellular panel 1129 with the structural battery pack 1100. The electrical wiring can also be coupled to the solar panels 1131 to enable the solar panels 1131 to charge the structural battery pack 1100. In an embodiment, the structural battery pack 1100 is configured as the sole source of power to the cellular panel 1129. In another embodiment, the electrical wiring is also coupled to another source of power, such as the grid, and the structural battery pack 1100 is configured to provide back-up power when needed.

The nondescript nature of the structural battery packs may also serve as a theft deterrent. For example, the structural battery packs can be less prone to theft because they are less noticeable or can be more easily hidden. The compact nature of the structural battery packs allows the structural battery packs to be installed and operated in non-traditional locations. Traditional locations can include, for example, equipment shelters located on the ground next to cell towers. The structural battery packs disclosed herein may be included in the base of a cell tower, for instance, or installed off the ground and higher up on the cell tower to discourage or prevent theft. The nondescript and compact nature of the structural battery packs may also help to provide an inconspicuous appearance or aesthetic appeal by allowing the structural battery packs to hide or blend in with surrounding environments, such as in urban areas, cellular sties, remote environmental areas, etc.

While embodiments of the structural battery packs shown in FIGS. 6-11 are described or shown herein with reference to an exemplary structural battery pack, it should be appreciated that other suitable structural battery packs as described herein may also be applicable and can be implemented in other embodiments.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations, or operations in an order. Accordingly, the scope and spirit of the invention should only be judged in terms of any accompanying claims that may be appended, as well as any legal equivalents thereof.

Reference throughout the specification to "an embodiment" or "an embodiment" is used to mean that a particular feature, structure or characteristic described in connection with an embodiment is included in at least an embodiment. Thus, the appearance of the expressions "in an embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, embodiments other than those specific described above are equally possible within the scope of any accompanying claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

For purposes of explanation, numerous specific details are set forth in order to provide a thorough understanding of the description. It should be apparent, however, to one skilled in the art that embodiments of the disclosure can be practiced without these specific details. In some instances, modules, structures, processes, features, and devices are shown in functional block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. It should be appreciated that the block diagrams may include additional components that are not necessarily shown or described, but which have been left out for the sake of clarity and brevity.

What is claimed is:

1. A structural battery pack comprising:
   a hollow elongated member comprising a first end, a second end, and a first interior space between the first and second ends of the hollow elongated member, wherein the hollow elongated member extends longitudinally between the first and second ends of the hollow elongated member; and
   one or more batteries disposed around the hollow elongated member between the first and second ends of the hollow elongated member;
   wherein each of the one or more batteries comprises:
      one or more electrochemical cells; and
      a through-hole extending through the respective battery; and
   wherein the hollow elongated member is disposed so as to extend through the through-hole of each of the one or more batteries such that the electrochemical cells are disposed outside of the hollow elongated member.

2. The structural battery pack of claim 1, wherein each of the one or more batteries comprises:
   a base comprising a body having a hole disposed in a surface of the body;
   an inner wall extending away from the surface of the base and disposed around the hole, wherein the inner wall comprises a first interior side and a first exterior side, wherein the first interior side of the inner wall and the hole form at least part of the through-hole extending through the respective battery, and wherein the through-hole is shaped and sized to fit the hollow elongated member within the through-hole; and
   an outer wall extending away from the surface of the base and disposed around the inner wall and the hole, wherein the outer wall comprises a second interior side and a second exterior side, and wherein the outer wall extends away from the surface of the base in the same direction as the inner wall extends from the surface of the base such that the first exterior side of the inner wall faces the second interior side of the outer wall;
   wherein a plurality of the electrochemical cells is disposed on the surface of the base and between the first exterior side of the inner wall and the second interior side of the outer wall.

3. The structural battery pack of claim 1, further comprising a first base, wherein the hollow elongated member extends away from the first base to the first end of the hollow elongated member, wherein the first end of the hollow elongated member is distal to the first base, and wherein each of the one or more batteries are disposed around the hollow elongated member between the first base and the first end of the hollow elongated member.

4. The structural battery pack of claim 3, further comprising an end cap, wherein the hollow elongated member extends away from the end cap to the second end of the hollow elongated member, wherein the second end of the hollow elongated member is distal to the end cap, and wherein each of the one or more batteries are disposed:
   between the end cap and the second end of the hollow elongated member; and
   between the end cap and the first base.

5. The structural battery pack of claim 4, further comprising:
   a hollow elongated shell comprising a second interior space between first and second ends of the hollow elongated shell, wherein the hollow elongated shell extends longitudinally between the first and second ends of the hollow elongated shell, wherein the hollow elongated shell extends away from the first base to the first end of the hollow elongated shell, wherein the hollow elongated shell extends away from the end cap to the second end of the hollow elongated shell, and wherein each of the one or more batteries are disposed in the second interior space of the hollow elongated shell; and
   one or more protective inserts disposed around the hollow elongated member, wherein the one or more protective inserts are disposed within the second interior space of the hollow elongated shell.

6. The structural battery pack of claim 1, further comprising: a first wire coupled to a first terminal of the one or more batteries, wherein the first terminal serves as a first end of voltage potential for the one or more batteries, and wherein the first wire extends through the hollow elongated member; a second wire coupled to a second terminal of the one or more batteries, wherein the second terminal serves as a second end of voltage potential for the one or more batteries; wherein the one or more batteries comprises a plurality of rechargeable lithium-ion batteries; and interconnecting bars coupled between each of the plurality of rechargeable lithium-ion batteries such that the plurality of rechargeable lithium-ion batteries are configured to generate the voltage potential.

7. The structural battery pack of claim 6, wherein each of the one or more batteries comprises:
   a second base comprising a body having a hole centrally disposed in a surface of the body;
   an inner wall extending away from the surface of the second base and concentrically disposed around and adjacent to the hole, wherein the inner wall comprises a first interior side and a first exterior side, wherein the first interior side of the inner wall and the hole form at least part of the through-hole extending through the respective battery, and wherein the through-hole is shaped and sized to fit the hollow elongated member within the through-hole; and
   an outer wall extending away from the surface of the second base and concentrically disposed around the inner wall and the hole, wherein the outer wall comprises a second interior side and a second exterior side, wherein the outer wall extends away from the surface of the base in the same direction as the inner wall extends from the surface of the base such that the first exterior side of the inner wall faces the second interior side of the outer wall, and wherein the second exterior side of the outer wall forms part of an exterior of the respective battery;
   wherein a plurality of the electrochemical cells is rechargeable and disposed on the surface of the second base and between the first exterior side of the inner wall and the second interior side of the outer wall.

8. The structural battery pack of claim 7, wherein the hollow elongated shell has a hexagonal-tube shape, and wherein the end cap and the first base have a hexagonal shape and are sized to align with the first and second ends of the hollow elongated shell, respectively.

9. The structural battery pack of claim 8, wherein the outer wall has a hexagonal-tube shape.

10. The structural battery pack of claim 3, further comprising one or more protective inserts disposed around the hollow elongated member, wherein the one or more protective inserts are disposed around the hollow elongated member between the first base and the first end of the hollow elongated member.

11. A structural battery pack comprising:
   a hollow elongated member comprising a first interior space between first and second ends of the hollow elongated member;
   one or more batteries disposed around the hollow elongated member between the first and second ends of the hollow elongated member;
   wherein each of the one or more batteries comprises a through-hole; and
   wherein the hollow elongated member is disposed through the through-hole of each of the one or more batteries;
   a first base, wherein the hollow elongated member extends away from the first base to the first end of the hollow elongated member, wherein the first end of the hollow elongated member is distal to the first base, and wherein the one or more batteries are disposed around the hollow elongated member between the first base and the first end of the hollow elongated member; and
   a hollow elongated shell comprising a second interior space between first and second ends of the hollow elongated shell, wherein the hollow elongated shell extends away from the first base to the first end of the hollow elongated shell, and wherein the batteries are disposed in the second interior space of the hollow elongated shell.

12. The structural battery pack of claim 11, further comprising an end cap, wherein the hollow elongated member extends away from the end cap to the second end of the hollow elongated member, wherein the hollow elongated shell extends away from the end cap to the second end of the hollow elongated shell, wherein the second end of the hollow elongated member is distal to the end cap, and wherein each of the one or more batteries are disposed:
   between the end cap and the second ends of the hollow elongated member and the hollow elongated shell; and
   between the end cap and the first base.

13. The structural battery pack of claim 11, further comprising one or more protective inserts disposed around the hollow elongated member, wherein the one or more protective inserts are disposed within the second interior space of the hollow elongated shell.

14. The structural battery pack of claim 11, further comprising:
   a first wire coupled to a first terminal of the one or more batteries, wherein the first terminal serves as a first end of voltage potential for the one or more batteries, and wherein the first wire extends through the hollow elongated member;
   a second wire coupled to a second terminal of the one or more batteries, wherein the second terminal serves as a second end of voltage potential for the one or more batteries;
   wherein the one or more batteries comprises a plurality of rechargeable batteries; and
   interconnecting bars coupled between each of the plurality of rechargeable batteries such that the plurality of rechargeable batteries is configured to generate the voltage potential.

15. The structural battery pack of claim 11, wherein the hollow elongated shell has a hexagonal-tube shape.

16. The structural battery pack of claim 15, further comprising an end cap configured to couple to the first end of the hollow elongated shell;
   wherein the hollow elongated member extends away from the end cap to the second end of the hollow elongated member;
   wherein the hollow elongated shell extends away from the end cap to the second end of the hollow elongated shell;
   wherein the second end of the hollow elongated member is distal to the end cap;
   wherein each of the one or more batteries are disposed:
      between the end cap and the second end of the hollow elongated member; and
      between the end cap and the first base;
   wherein each of the one or more batteries comprises:
      a second base comprising a body having a hole centrally disposed in a surface of the body;
      an inner wall extending away from the surface of the second base and concentrically disposed around and adjacent to the hole, wherein the inner wall comprises a first interior side and a first exterior side, wherein the first interior side of the inner wall and the hole form at least part of the through-hole extending through the respective battery, and wherein the through-hole is shaped and sized to fit the hollow elongated member within the through-hole; and an outer wall extending away from the surface of the second base and concentrically disposed around the inner wall and the hole, wherein the outer wall comprises a second interior side and a second exterior side, wherein the outer wall extends away from the surface of the base in the same direction as the inner wall extends from the surface of the base such that the first exterior side of the inner wall faces the second interior side of the outer wall, and wherein the second exterior side of the outer wall forms part of an exterior of the respective battery;

wherein a plurality of cells is rechargeable and disposed on the surface of the second base and between the first exterior side of the inner wall and the second interior side of the outer wall;

wherein the end cap and the first base have a hexagonal shape and are sized to align with the first and second ends of the hollow elongated shell, respectively; and wherein the outer wall has a hexagonal-tube shape.

17. A structural battery pack comprising:

a hollow elongated member comprising a first end, a second end, and a first interior space between the first and second ends of the hollow elongated member, wherein the hollow elongated member extends longitudinally between the first and second ends of the hollow elongated member;

a plurality of batteries configured to be disposed around the hollow elongated member between the first and second ends of the hollow elongated member, wherein each battery of the plurality of batteries comprises:
one or more electrochemical cells; and
a through-hole extending through the respective battery;
wherein the hollow elongated member is configured to be disposed so as to extend through the through-hole of each battery of the plurality of batteries such that the electrochemical cells are disposed outside of the hollow elongated member; and a hollow elongated shell comprising a second interior space between first and second ends of the hollow elongated shell, wherein the hollow elongated shell extends longitudinally between the first and second ends of the hollow elongated shell, and wherein the hollow elongated shell is configured to house the hollow elongated member and each battery of the plurality of batteries within the second interior space of the hollow elongated shell.

18. The structural battery pack of claim 17, further comprising:

a base configured to couple to the second end of the hollow elongated shell and to the second end of the hollow elongated member; and an end cap configured to couple to the second end of the hollow elongated shell and to the second end of the hollow elongated member;

wherein each of the one or more batteries are configured to be disposed between the end cap and the base; and wherein the hollow elongated shell, the end cap, and the base are configured to house the hollow elongated member and each battery of the plurality of batteries within the second interior space of the hollow elongated shell.

19. The structural battery pack of claim 17, further comprising one or more protective inserts configured to be disposed around the hollow elongated member, wherein the one or more protective inserts are configured to be disposed within the second interior space of the hollow elongated shell and extend away from the hollow elongated member toward the hollow elongated shell.

20. The structural battery pack of claim 17, wherein the hollow elongated shell has a hexagonal-tube shape.

21. The structural battery pack of claim 17, wherein the one or more batteries comprises a plurality of rechargeable batteries, and wherein the structural battery pack further comprises:

a first wire configured to couple to a first terminal of the plurality of rechargeable batteries, wherein the first terminal serves as a first end of voltage potential for the plurality of rechargeable batteries, and wherein the first wire extends through the hollow elongated member;

a second wire configured to couple to a second terminal of the plurality of rechargeable batteries, wherein the second terminal serves as a second end of voltage potential for the plurality of rechargeable batteries; and interconnecting bars configured to couple between each of the plurality of rechargeable batteries such that the plurality of rechargeable batteries are configured to generate the voltage potential.

22. The structural battery pack of claim 17, wherein the hollow elongated shell has a hexagonal-tube shape, and wherein each of the one or more batteries comprises:

a second base comprising a body having a hole centrally disposed in a surface of the body;

an inner wall extending away from the surface of the second base and concentrically disposed around and adjacent to the hole, wherein the inner wall comprises a first interior side and a first exterior side, wherein the first interior side of the inner wall and the hole form at least part of the through-hole extending through the respective battery, and wherein the through-hole is shaped and sized to fit the hollow elongated member within the through-hole; and an outer wall extending away from the surface of the second base and concentrically disposed around the inner wall and the hole, wherein the outer wall comprises a second interior side and a second exterior side, wherein the outer wall extends away from the surface of the base in the same direction as the inner wall extends from the surface of the base such that the first exterior side of the inner wall faces the second interior side of the outer wall, wherein the outer wall has a hexagonal-tube shape, and wherein the second exterior side of the outer wall forms part of an exterior of the respective battery;

wherein a plurality of the electrochemical cells is rechargeable and disposed on the surface of the second base and between the first exterior side of the inner wall and the second interior side of the outer wall.

* * * * *